(12) United States Patent
Robinson-Morgan et al.

(10) Patent No.: US 12,225,129 B2
(45) Date of Patent: *Feb. 11, 2025

(54) COMPLIANCE PLATFORM FOR USE WITH IDENTITY DATA

(71) Applicant: Mastercard International Incorporated, Purchase, NY (US)

(72) Inventors: Bryn Anthony Robinson-Morgan, Mosborough Village (GB); Prashant Sharma, Madison, NJ (US); Liang Tian, Rye Brook, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,470

(22) Filed: Oct. 31, 2023

(65) Prior Publication Data

US 2024/0064015 A1    Feb. 22, 2024

Related U.S. Application Data

(63) Continuation of application No. 17/318,982, filed on May 12, 2021, now Pat. No. 11,811,926.

(51) Int. Cl.
*H04L 9/08* (2006.01)
*G06F 16/955* (2019.01)
(Continued)

(52) U.S. Cl.
CPC ............ *H04L 9/14* (2013.01); *G06F 16/9566* (2019.01); *G06Q 30/018* (2013.01);
(Continued)

(58) Field of Classification Search
CPC . H04L 9/14; H04L 9/08; H04L 9/0819; H04L 9/0894; H04L 9/0838; H04L 9/085;
(Continued)

(56) References Cited

U.S. PATENT DOCUMENTS 9,667,416 B1 *  5/2017  Machani ............... H04L 9/3215
9,667,427 B2    5/2017  Oberhauser et al.
(Continued)

FOREIGN PATENT DOCUMENTS

GB           2587028 A      3/2021

OTHER PUBLICATIONS

PCT/US2022/022096 PCT International Written Opinion and Search Report dated Sep. 12, 2022, pp. 1-13.
(Continued)

*Primary Examiner* — Shaqueal D Wade-Wright
(74) *Attorney, Agent, or Firm* — Pramudji Law Group PLLC; Ari Pramudji

(57) ABSTRACT

Various implementations described herein may refer to a compliance platform for use with identity data. In one implementation, a method may include receiving a compliance data package from a user, where the compliance data package includes encrypted evidence data corresponding to digital identity data of the user. The method may also include encrypting the compliance data package using a first cryptographic key. The method may further include generating a user key shard, a requestor key shard, and a regulator key shard based on the first cryptographic key. The method may include generating an unlock data package that includes the requestor key shard and encrypting the unlock data package using a second cryptographic key. The method may also include transmitting the user key shard, the encrypted unlock data package, and the encrypted compliance data package to the user. The method may include transmitting the regulator key shard to a regulator.

20 Claims, 6 Drawing Sheets

(51) Int. Cl.
*G06Q 30/018* (2023.01)
*G06Q 50/26* (2012.01)
*H04L 9/14* (2006.01)
*H04L 9/40* (2022.01)

(52) U.S. Cl.
CPC ......... *G06Q 50/265* (2013.01); *H04L 9/0819* (2013.01); *H04L 9/0894* (2013.01); *H04L 63/0428* (2013.01)

(58) Field of Classification Search
CPC ......... H04L 9/0816; H04L 9/32; H04L 63/04; H04L 63/0428; H04L 63/10; H04L 63/105; H04L 63/045; G06F 16/955; G06F 16/9566
See application file for complete search history.

(56) References Cited

U.S. PATENT DOCUMENTS

| | | | |
|---|---|---|---|
| 9,735,959 | B2 | 8/2017 | Karame et al. |
| 10,476,862 | B2 | 11/2019 | Kamal |
| 10,506,104 | B1 | 12/2019 | Shakeri |
| 10,650,632 | B2 | 5/2020 | Kamal et al. |
| 10,659,458 | B2 | 5/2020 | Valenti et al. |
| 10,848,496 | B2 | 11/2020 | Praszczalek et al. |
| 11,398,902 | B2 | 7/2022 | Lanc |
| 2013/0145174 | A1* | 6/2013 | Hallum .................. G06Q 10/10 713/189 |
| 2013/0212393 | A1 | 8/2013 | D'Souza |
| 2015/0356523 | A1 | 12/2015 | Madden |
| 2018/0248699 | A1 | 8/2018 | Andrade |
| 2019/0182042 | A1* | 6/2019 | Ebrahimi .............. H04L 9/3234 |
| 2019/0188704 | A1 | 6/2019 | Grendon et al. |
| 2019/0207951 | A1 | 7/2019 | Oberhauser et al. |
| 2019/0288840 | A1 | 9/2019 | Gallancy et al. |
| 2019/0303349 | A1 | 10/2019 | Burshteyn |
| 2019/0318356 | A1 | 10/2019 | Martin et al. |
| 2020/0013055 | A1 | 1/2020 | Sandor |
| 2020/0065501 | A1 | 2/2020 | Murphy et al. |
| 2020/0076602 | A1 | 3/2020 | Redpath et al. |
| 2020/0097924 | A1 | 3/2020 | Arora et al. |
| 2020/0111080 | A1 | 4/2020 | Metcalfe et al. |
| 2020/0153627 | A1 | 5/2020 | Wentz |
| 2020/0244634 | A1 | 7/2020 | Benavides et al. |
| 2020/0250674 | A1 | 8/2020 | Modi et al. |
| 2020/0374132 | A1 | 11/2020 | Lobban et al. |
| 2021/0004799 | A1 | 1/2021 | Buckman et al. |
| 2021/0019763 | A1 | 1/2021 | Helles et al. |
| 2021/0056557 | A1 | 2/2021 | Sharma et al. |
| 2021/0344485 | A1* | 11/2021 | Levin .................. H04L 9/0825 |
| 2021/0375409 | A1 | 12/2021 | Romantsov et al. |
| 2022/0014367 | A1 | 1/2022 | Law et al. |

OTHER PUBLICATIONS

U.S. Appl. No. 17/075,592; filed Oct. 20, 2020; Sharma, et al.
Digital identity trends—5 forces that are shaping 2020; https://www.thalesgroup.com/en/markets/digital-identity-and-security/government/identity/digital-identity-services/trends; Oct. 17, 2020; Accessed May 12, 2021.
Baya; Digital Identity: Moving to a Decentralized Future—Decentralized Identity Improves the End-User Experience and Helps Enterprises Strengthen Data Privacy; https://www.citi.com/ventures/perspectives/opinion/digital-identity.html; Oct. 9, 2019; Accessed May 12, 2021.
Becker; The New Internet: Getting Ready for Decentralized Identity & the Personal Information Economy; Identity Praxis, Inc., https://identitypraxis.com/2019/04/06/getting-ready-for-decentralized-identity-the-personal-information-economy/; Apr. 6, 2019; Accessed May 12, 2021.

* cited by examiner

COMPLIANCE PLATFORM FOR USE WITH IDENTITY DATA

CROSS-REFERENCE TO RELATED APPLICATIONS

This application is a continuation of U.S. patent application Ser. No. 17/318,982, filed May 12, 2021, the entire disclosure of which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In a number of scenarios, an entity may seek to verify an identity of an individual, such as by acquiring and verifying information relating to the individual's identity. For example, for an individual seeking to open a bank account with a financial institution, the financial institution may obtain and then verify information relating to the individual's name, date of birth, street address, and/or the like. In some scenarios, the entity may attempt to acquire and verify this information in accordance with one or more rules and/or regulations.

SUMMARY

Described herein are implementations of various technologies relating to a compliance platform for use with identity data. In one implementation, a method may include receiving a compliance data package from a user, where the compliance data package includes encrypted evidence data corresponding to digital identity data of the user. The method may also include encrypting the compliance data package using a first cryptographic key. The method may further include generating a plurality of key shards based on the first cryptographic key, where the plurality of key shards includes a user key shard, a requestor key shard, and a regulator key shard. The method may additionally include generating an unlock data package, where the unlock data package includes the requestor key shard. The method may also include encrypting the unlock data package using a second cryptographic key. The method may further include transmitting the user key shard, the encrypted unlock data package, and the encrypted compliance data package to the user. The method may additionally include transmitting the regulator key shard to a regulator.

In another implementation, the method may include receiving identity request data from a requestor, where the identity request data includes data indicating a request for digital identity data of a user and a compliance data package corresponding to the digital identity data. The method may also include encrypting evidence data using a requestor public key of a requestor public-private key pair. The method may further include generating the compliance data package based on the encrypted evidence data. The method may additionally include transmitting the compliance data package to a compliance platform.

In yet another implementation, a system may include a communications device having one or more processors and one or more memory. The one or more memory may include a plurality of program instructions which, when executed by the one or more processors, cause the one or more processors to receive identity request data from a requestor, where the identity request data includes data indicating a request for digital identity data of a user and a compliance data package corresponding to the digital identity data. The plurality of program instructions, when executed by the one or more processors, may also cause the one or more processors to encrypt the evidence data using a requestor public key of a requestor public-private key pair. The plurality of program instructions, when executed by the one or more processors, may further cause the one or more processors to generate the compliance data package based on the encrypted evidence data. The plurality of program instructions, when executed by the one or more processors, may additionally cause the one or more processors to transmit the compliance data package to a compliance platform. The system may also include a compliance platform having one or more processors and one or more memory. The one or more memory may include a plurality of program instructions which, when executed by the one or more processors, cause the one or more processors to receive the compliance data package from the communications device. The plurality of program instructions, when executed by the one or more processors, may also cause the one or more processors to encrypt the compliance data package using a first cryptographic key. The plurality of program instructions, when executed by the one or more processors, may further cause the one or more processors to generate a plurality of key shards based on the first cryptographic key, where the plurality of key shards includes a user key shard, a requestor key shard, and a regulator key shard. The plurality of program instructions, when executed by the one or more processors, may additionally cause the one or more processors to generate an unlock data package, where the unlock data package includes the requestor key shard. The plurality of program instructions, when executed by the one or more processors, may also cause the one or more processors to encrypt the unlock data package using a second cryptographic key. The plurality of program instructions, when executed by the one or more processors, may further cause the one or more processors to transmit the user key shard, the encrypted unlock data package, and the encrypted compliance data package to the communications device. The plurality of program instructions, when executed by the one or more processors, may additionally cause the one or more processors to transmit the regulator key shard to a regulator.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
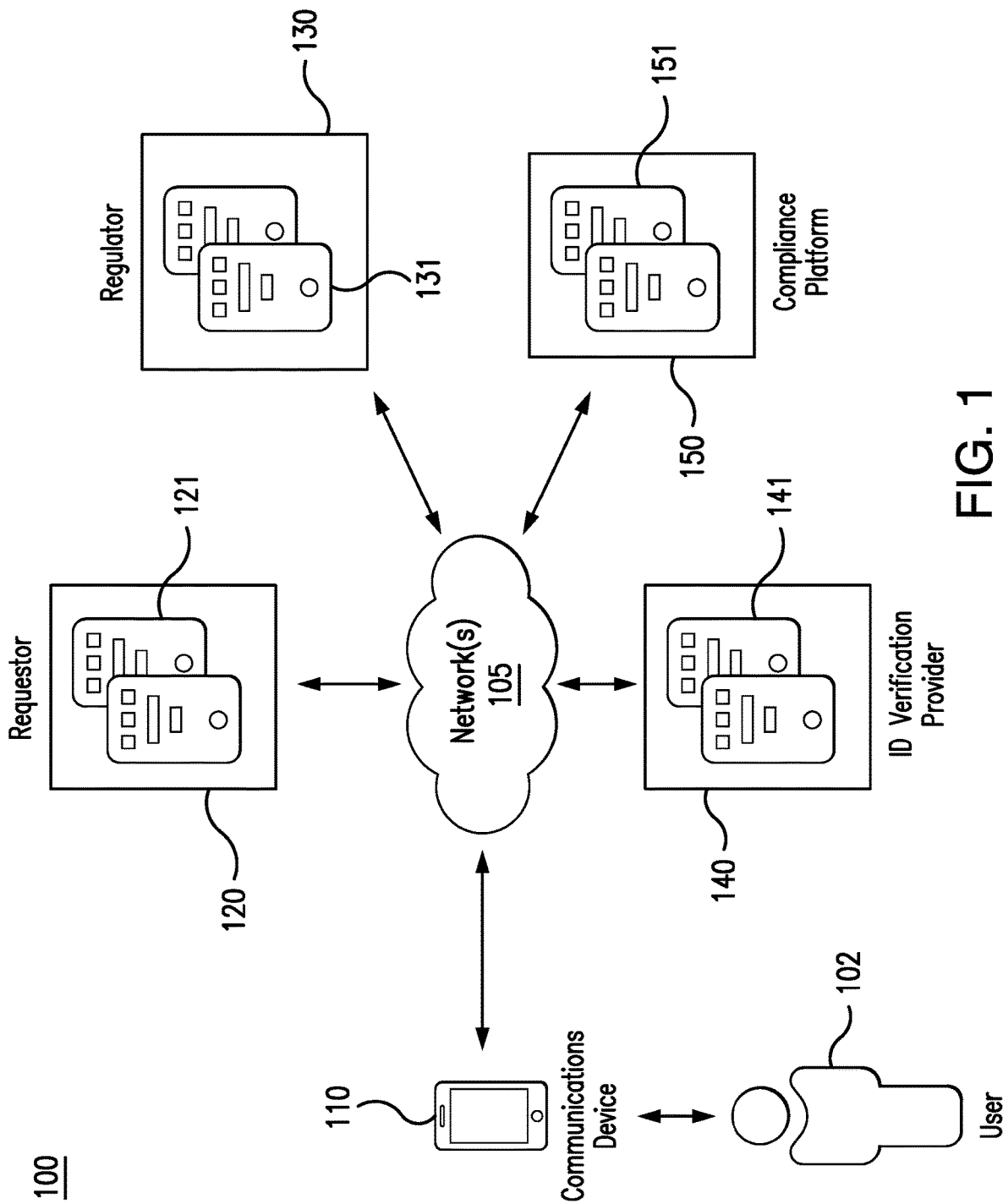
FIG. 1 illustrates a schematic diagram of a system using a compliance platform in accordance with implementations of various techniques described herein.

Various implementations directed to a compliance platform for use with identity data will now be described in the following paragraphs with reference to FIGS. 1-6.

I. Decentralized Identity

In a number of scenarios, an entity may seek to verify an identity of a user in order to corroborate that the user is who the user claims to be. "Verifying an identity of a user" may also be referred to herein as "identity verification of a user," "authentication of a user," or "authenticating a user," and these terms and/or phrases may hereinafter be used interchangeably. An entity may be a merchant, a service provider, a financial institution, a government agency, and/or any other type of entity known to those skilled in the art. A user may be an individual, another entity, and/or any other type of user known to those skilled in the art.

An identity of a user may include and/or correspond to one or more identity attributes that can be used to uniquely identify the user. Such identity attributes may include, but are not limited to, the following: name, date of birth, address, government identification number (e.g., social security number, driver's license number, and/or the like), contact information, citizenship status, physical characteristics, and/or any other type of identity attribute known to those skilled in the art.

In particular, the entity may seek to verify the user's identity before permitting the user to access one or more resources provided by and/or managed by the entity. Such resources may include, but are not limited to, the following: one or more goods, one or more services, one or more physical locations (e.g., a room, a building, and/or a facility), one or more devices (e.g., a workstation, a server, and/or a personal computer), one or more modes of transportation (e.g., an automobile, an airplane, and/or a train), one or more financial accounts (e.g., a bank account, a credit card account, and/or an investment account), one or more government accounts (e.g., a taxpayer account and/or a social security account), and/or the like. Examples of an entity seeking to verify an identity of a user may include, but are not limited to, the following: a government agency seeking to verify an identity of an individual before transferring an income tax refund to the individual; a property ownership entity seeking to verify an identity of an individual before agreeing to sell real property to the individual; and, a financial institution seeking to verify an identity of an individual before allowing the individual to open an investment account with the financial institution.

In one scenario, an entity may verify an identity of a user by acquiring and verifying information relating to the user's identity, where such information may also be referred herein to as identity information. In particular, the identity information may include information relating to one or more of the identity attributes mentioned above. In some scenarios, the user may provide the identity information to the entity.

A. Digital Identity Data

In a decentralized identity system, a user may provide the identity information to the entity by sharing at least a portion of the user's digital identity with the entity. A digital identity for a user may include any data that can be used to uniquely identify the user, including any data relating to the identity information described above. Such data may hereinafter be referred to as digital identity data.

Further, in the decentralized identity system, the user may be the holder of its digital identity data (i.e., its digital identity), such that the user may control how the data is accessed and/or shared. In particular, in such a system, the user may exert control over whether any of its digital identity data is shared, with whom its digital identity data is shared, and/or the like. In addition, the user's digital identity data may be stored on an associated device of the user. For example, the user may be an individual whose digital identity data is stored in, and managed using, a digital wallet on the individual's smartphone.

In some scenarios, the digital identity data may include one or more digital identity attributes and/or one or more digital credentials. A digital identity attribute of a user may include data that corresponds to a particular identity attribute of the user. For example, a digital identity attribute of an individual may include data that indicates the individual's citizenship status. The digital identity attribute may also be referred to herein as a claim, and these terms may hereinafter be used interchangeably. In a further scenario, the digital identity attribute may be issued by a third party, where the third party may be unrelated to the user and/or the entity. In such a scenario, by issuing the digital identity attribute, the third party may be indicating that it has verified the data of the digital identity attribute. In particular, by providing the digital identity attribute, the third party may be attesting that it has taken one or more actions to confirm the veracity of the data of the digital identity attribute.

For example, a government agency (i.e., the third party) may issue a digital identity attribute relating to a citizenship status for an individual, where the digital identity attribute includes data indicating that the individual is a legal citizen. In such an example, by issuing this digital identity attribute, the government agency indicates that it has verified the data indicating the individual's citizenship status (i.e., that the individual is a legal citizen). In particular, by providing this digital identity attribute, the government agency attests that it has taken one or more actions to confirm the accuracy of the data that indicates that the individual is a legal citizen.

A digital credential for a user may correspond to a collection of digital identity attributes for the user. The digital credential may be represented as a document, a file, and/or the like. In one scenario, a digital credential for a user may be issued by a third party in a similar manner as described above for the digital identity attribute. In such a scenario, by issuing the digital credential, the third party may be indicating that it has verified the data of each digital identity attribute for the user included in the credential. In particular, by providing the digital credential, the third party may be attesting that it has taken one or more actions to confirm the veracity of the data of each digital identity attribute included in the credential.

For example, a digital credential may be in the form of a digital driver's license issued to an individual by a state government's Department of Motor Vehicles (DMV) (i.e., the third party). The digital driver's license may include numerous digital identity attributes for the individual, where the digital identity attributes include data indicating the individual's name, street address, date of birth, physical characteristics, and driver's license number. In such an example, by issuing the digital driver's license, the DMV indicates that it has verified the data of each digital identity attribute for the individual included in the license. In particular, by providing the digital driver's license, the DMV attests that it has taken one or more actions to confirm the accuracy of the data of the digital identity attributes that indicate the individual's name, street address, date of birth, physical characteristics, and driver's license number.

A third party that issues such digital identity data (i.e., one or more digital identity attributes and/or one or more digital credentials) may be referred to herein as an issuer. The issuer may be a government agency, a financial institution, and/or any other entity known in the art. In some scenarios, an issuer may verify the data of the digital identity data based on one or more proofs of identity. A proof of identity may include any type of proof known to those skilled in the art, such as, for example, one or more physical identification documents (e.g., a passport, a government-issued driver's license, a government-issued identification card, a social security card, a health insurance card, a bank statement, an employee identification card, a library card, a utility bill, and/or the like).

In a decentralized identity system, an issuer may issue digital identity data (i.e., one or more digital identity attributes and/or one or more digital credentials) to a user, and the user may store the issued data on an associated device (e.g., in a digital wallet on a smartphone). In some scenarios, the user may store, on the associated device, digital identity data that had been issued by more than one issuer. In further scenarios, the issuer and/or the user may also store the issued digital identity data in a ledger data structure, where the ledger data structure may be used to record and verify digital identity data for multiple users. In one such scenario, the ledger data structure may be a blockchain data structure, where the blockchain data structure may include a continually growing list of ordered records corresponding to digital identity data for multiple users, and where each record may include a timestamp and/or a reference or link to a prior record. However, those skilled in the art will understand that any form of ledger data structure may be used. In a further scenario, the digital identity data may be stored in the ledger data structure using one or more cryptographic keys corresponding to the users and/or the issuers.

Once a user is in control of, and/or in possession of, its digital identity in a decentralized identity system (e.g., after the user's digital identity data has been stored on an associated device), the user may then use at least a portion of its digital identity to gain access to one or more resources provided by and/or managed by an entity. As noted above, the entity may attempt to acquire and verify the user's identity information (i.e., the user's identity) before permitting the user to access the one or more resources. Via the decentralized identity system, the user may provide this identity information by sharing at least a portion of its digital identity data (e.g., one or more digital identity attributes and/or one or more digital credentials) with the entity. Once the user has shared its digital identity data with the entity, the entity may then verify the data using any technique known to those skilled in the art. In one scenario, the entity may verify the shared digital identity data by confirming that the data (i.e., one or more digital identity attributes and/or one or more digital credentials) was actually issued by one or more issuers. For example, the entity may use the ledger data structure and/or the one or more cryptographic keys mentioned above to confirm that the shared digital identity data was issued by one or more issuers, such as by validating one or more digital signatures of the one or more issuers and/or the user.

Once the entity confirms that the digital identity data shared by the user was issued by the one or more issuers, the entity may then deem the shared digital identity data as verified if the entity considers the one or more issuers of the data to be trustworthy. As a result, the entity may consider the user's identity information included in the shared digital identity data to be verified and, in turn, the user's identity to also be verified. Once the user's identity has been verified, the entity may permit the user to access the one or more resources provided by and/or managed by the entity.

Thus, using a decentralized identity system, an entity may verify an identity of a user based on at least a portion of a digital identity shared by the user. In particular, the entity may verify the user's identity by acquiring and verifying at least a portion of the user's digital identity data (e.g., one or more digital identity attributes and/or one or more digital credentials), as described above. In some scenarios, using the decentralized identity system, the entity may be able to verify the user's identity based on the user's digital identity data, such that the user does not need to provide the entity with other proof of identity (e.g., the one or more physical identification documents). As a result, in these scenarios, the user may be able to access the one or more resources provided by and/or managed by the entity while minimizing the extent to which the user's physical identification documents are shared with the entity. By limiting the distribution of a user's physical identification documents among one or more entities in such a manner via a decentralized identity system, a misappropriation of these identity documents (such as through hacking and/or theft) may be less likely to occur when compared to other identity systems. Consequently, the user may be less likely to become a victim of identity theft and/or other misuses of the user's identity.

In addition, as noted above, in a decentralized identity system, a user may exert control over whether any of its digital identity data is shared, with whom its digital identity data is shared, and/or the like. In particular, in the decentralized identity system, the user may be able to utilize data minimization and share only a subset of its digital identity data (e.g., specific identity information) with an entity, where the size of the subset can be determined by the user. In some scenarios, in the decentralized identity system, the user may choose to share only the minimum amount of its digital identity data (e.g., a specific digital identity attribute and/or a specific digital credential) that is needed to perform a transaction with a specific entity (e.g., to gain access to the entity's resources). As a result, using the decentralized identity system, the user may be able to access the one or more resources provided by and/or managed by the entity while minimizing the extent to which the user's identity information is shared with the entity. By limiting the distribution of a user's identity information among one or more entities in such a manner via a decentralized identity system, a misappropriation of this information (such as through hacking and/or theft) may be less likely to occur when compared to other identity systems. Consequently, the user may be less likely to become a victim of identity theft and/or other misuses of the user's identity. Moreover, through the limited sharing of a user's digital identity data, an entity that seeks to verify the user's identity may also be able to utilize data minimization by reducing the amount of digital identity data that the entity stores and/or manages for the user.

For example, an individual may wish to enter a drinking establishment. The establishment may then seek to verify that the individual's age is greater than or equal to a legal drinking age. The individual may use a decentralized identity system to share a digital identity attribute with the establishment, where this digital identity attribute includes data indicating that the individual's age is at least equal to the legal drinking age while not actually revealing the individual's age or date of birth. In particular, the digital identity attribute may have been issued by the DMV (as described above), where the digital identity attribute was issued along with a digital driver's license (i.e., a digital credential). Once the individual shares the digital identity attribute with the drinking establishment, the drinking establishment may then verify that the individual is at least of legal drinking age by verifying this digital identity attribute (e.g., by at least confirming that the digital identity attribute was issued by the DMV). Thus, using the decentralized identity system, the individual may be able to successfully enter the drinking establishment while sharing a minimum amount of its digital identity data. In particular, the individual may avoid sharing other digital identity attributes with the drinking establishment, such as digital identity attributes that may be included in the digital driver's license (e.g., digital identity attributes relating to the individual's actual date of birth, street address, driver's license number, and/or the like).

B. Evidence Data

In a number of scenarios, verifying a user's identity using a decentralized identity system in the manner described above may be sufficient for an entity. In particular, if the entity is able to acquire and verify the digital identity data shared by the user, as described above, then the entity may allow the user to access the one or more resources provided by and/or managed by the entity. However, in some scenarios, the above-described verification of a user's identity via a decentralized identity system may be insufficient for an entity. In such scenarios, the entity may also require the user to provide, or at least provide access to, additional data that can be used to verify the digital identity shared by the user. This additional data may hereinafter be referred to as evidence data.

Evidence data may include any data that can corroborate digital identity data provided by a user. For example, the evidence data may include image data (e.g., scanned images) corresponding to one or more physical identification documents of the user, where such documents may include, but are not limited to, the following: a passport, a government-issued driver's license, a government-issued identification card, a social security card, a health insurance card, a bank statement, an employee identification card, a library card, a utility bill, and/or the like. With the user providing, or at least providing access to, such evidence data, the entity may be able to verify the user's identity more rigorously. In turn, the entity may be less likely to be defrauded by the user. In addition, in some scenarios, the entity may require the user to provide, or at least provide access to, the evidence data before allowing the user to access the entity's one or more resources, thereby avoiding instances in which the user disappears and/or declines to provide the evidence data after the user has already defrauded the entity.

In further scenarios, the entity may require the user to provide, or at least provide access to, this evidence data in order to comply with one or more rules and/or regulations. The one or more rules and/or regulations may have been instituted by the entity itself, by one or more industry organizations, and/or by one or more government agencies. For example, for an individual seeking to open a bank account with a banking institution, the banking institution may be required to conduct a "know your customer" (KYC) process in accordance with one or more government regulations. While the banking institution may acquire and verify the individual's shared digital identity data using the decentralized identity system as described above, the one or more government regulations may require the banking institution to also verify the individual's identity by obtaining, or at least being able to obtain, one or more physical identification documents (e.g., a passport, a government-issued driver's license, or a government-issued identification card) of the individual. In such an example, the banking institution may be able to verify the individual's identity more thoroughly, which may help to decrease the possibility of the individual using the banking institution to engage in financial fraud, money laundering, terrorist financing, and/or the like.

However, requiring a user of a decentralized identity system to also provide, or at least provide access to, evidence data may lead to a greater distribution of the user's evidence data (e.g., one or more physical identification documents) among one or more entities when compared to decentralized identity systems in which the user is not required to do so. In turn, a misappropriation of the user's evidence data may be more likely to occur (such as due to hacking and/or theft). In addition, requiring the user to provide, or at least provide access to, the evidence data may prevent the user and/or one or more entities from utilizing data minimization. In particular, by being required to share the evidence data, the user may be forced to reveal more identity information than is needed (e.g., identity information derived from the evidence data) in order to perform transactions with the one or more entities. Further, the one or more entities may be forced to store and/or manage the evidence data of the user. As a result, there may be a greater distribution of the user's identity information among the one or more entities when compared to decentralized identity systems in which the user is not required to provide, or at least provide access to, evidence data. In turn, a misappropriation of the user's identity information may be more likely to occur (such as due to hacking and/or theft). Consequently, given that misappropriations of the user's evidence data and identity information may be more likely to occur, the user may be more likely to become a victim of identity theft and/or other misuses of the user's identity.

II. Compliance Platform

In view of the above, various implementations for a compliance platform are disclosed herein. In particular, the compliance platform may be used to facilitate a sharing of a user's evidence data with a requestor in a decentralized identity system. In one implementation, the compliance platform may be configured to encrypt a compliance data package received from the user, where the compliance data package may include encrypted evidence data corresponding to the user's digital identity data. In particular, the compliance platform may be configured to encrypt the compliance data package using a first cryptographic key and to generate a plurality of key shards based on the first cryptographic key. The compliance platform may also be configured to generate and encrypt an unlock data package that includes a requestor key shard. The compliance platform may be configured to then transmit a user key shard, the encrypted unlock data package, and the encrypted compliance data package to the user. In response, the user may transmit its digital identity data, the encrypted unlock data package, and the encrypted compliance data package to the requestor. The compliance platform may also be configured to transmit a regulator key shard to a regulator.

In such an implementation, and as further explained below, the requestor may obtain the encrypted evidence data from the compliance data package only if the requestor can provide a key shard (i.e., the user key shard or the regulator key shard), the encrypted unlock data package, and the encrypted compliance data package to the compliance platform. Thus, the requestor may ultimately obtain the encrypted evidence data from the compliance platform only if the requestor is able to acquire a key shard from the user or the regulator beforehand. As a result, the compliance platform may be used to limit the requestor's access to the evidence data, which, in turn, may help the user to utilize data minimization. In particular, the distribution of the user's identity information (e.g., identity information derived from the evidence data) may be minimized, which, in turn, may lead to fewer instances of misappropriation of the user's identity information. In a further implementation, a cryptographic key of the requestor may be needed in order to decrypt the encrypted evidence data. Thus, in such an implementation, the distribution of the user's unencrypted evidence data may be minimized, which, in turn, may lead to fewer instances of misappropriation of the user's evidence data. Consequently, given that misappropriations of the user's evidence data and identity information may be less likely to occur, the user may be less likely to become a victim of identity theft, and/or other misuses of the user's identity, when using the compliance platform in accordance with the various implementations disclosed herein.

A. System

FIG. 1 illustrates a schematic diagram of a system 100 using a compliance platform 150 in accordance with implementations of various techniques described herein. The system 100 may include one or more networks 105, a user 102, a communications device 110, a requestor 120, a regulator 130, an identity verification provider 140, and the compliance platform 150.

The communications device 110, the requestor 120, the regulator 130, the identity verification provider 140, and the compliance platform 150 may be in communication with one another via the one or more networks 105. The one or more networks 105 may include, but are not limited to, one or more of the following networks: a local area network (LAN), a wide area network (WAN) (e.g., the Internet), a mobile network, a virtual network, and/or any other public and/or private network known in the art capable of supporting communication among two or more of the elements of the system 100.

The user 102 may be similar to the user described above, such that the user 102 may be an individual, an entity, and/or any other type of user known to those skilled in the art. Though FIG. 1 shows the user 102 as being an individual, those skilled in the art will understand that the implementations disclosed herein can be applied to instances in which the user 102 is an entity and/or any other type of user known in the art.

In addition, the user 102 may own, operate, and/or be associated with the communications device 110. The communications device 110 may be any computing device known to those skilled in the art, such as a mobile device, as shown in FIG. 1. Various implementations of the communications device 110 are discussed later with respect to FIG. 2. As further described below, the communications device 110 may be configured to perform one or more operations described herein, such as communicating with the requestor 120, the identity verification provider 140, and/or the compliance platform 150 via the one or more networks 105. In another implementation, as is also further described below, the communications device 110 may be configured to store, manage, and/or share a digital identity of the user 102 for use in a decentralized identity system, where the digital identity may include digital identity data. The digital identity, the digital identity data, and the decentralized identity system, respectively, may be the same as, respectively, the digital identity, the digital identity data, and the decentralized identity system discussed above. In particular, the digital identity data of the user 102 may also include the one or more digital identity attributes and/or the one or more digital credentials described above.

In some implementations, the user 102 may seek permission from the requestor 120 for access to one or more resources provided by and/or managed by the requestor 120. The requestor 120 may be similar to the entity described above, in that the requestor 120 may be a merchant, a service provider, a financial institution, a government agency, and/or any other type of entity known to those skilled in the art. As noted above, the one or more resources may include, but are not limited to, the following: one or more goods, one or more services, one or more physical locations (e.g., a room, a building, and/or a facility), one or more devices (e.g., a workstation, a server, and/or a personal computer), one or more modes of transportation (e.g., an automobile, an airplane, and/or a train), one or more financial accounts (e.g., a bank account, a credit card account, and/or an investment account), one or more government accounts (e.g., a taxpayer account and/or a social security account), and/or the like.

In particular, the requestor 120 may attempt to verify the identity of the user 102 before allowing the user 102 to access the one or more resources. Examples of the requestor 120 seeking to verify the identity of the user 102 may include, but are not limited to, the following: a government taxation agency seeking to verify an identity of the user 102 before transferring an income tax refund to the user 102; a property ownership entity seeking to verify an identity of the user 102 before agreeing to sell real property to the user 102; and, a banking institution seeking to verify an identity of the user 102 before allowing the user 102 to open a bank account with the banking institution.

In one implementation, the requestor 120 may attempt to authenticate the user 102 by acquiring and verifying at least a portion of the digital identity data of the user 102. In such an implementation, the requestor 120 may request that the user 102 share at least a portion of its digital identity data via the decentralized identity system. In some implementations, the requestor 120 may request that the user 102 share one or more specific digital identity attributes. For example, the requestor 120 may be a banking institution and may ask the user 102 to share digital identity attributes relating to a name, date of birth, address, and/or government identification number for the user 102.

In addition, in such an implementation, the requestor 120 may also request that the user 102 provide, or at least provide access to, evidence data that can be used to verify the digital identity data shared by the user 102. The evidence data may be the same as the evidence data discussed above, in that it may include any data that can corroborate the digital identity data provided by the user 102. For example, the evidence data may include image data (e.g., scanned images) corresponding to one or more physical identification documents of the user 102, where such documents may include, but are not limited to, the following: a passport, a government-issued driver's license, a government-issued identification card, a social security card, a health insurance card, a bank statement, an employee identification card, a library card, a utility bill, and/or the like.

In a further implementation, the requestor 120 may require that the user 102 provide, or at least provide access to, the evidence data in order to comply with one or more rules and/or regulations. The one or more rules and/or regulations may be the same as the one or more rules and/or regulations discussed above. For example, the requestor 120 may be a banking institution, where, before allowing the user 102 to open a bank account with the requestor 120, the requestor 120 may be required to conduct a KYC process in accordance with one or more government regulations. In such an example, the one or more government regulations may compel the requestor 120 to acquire information relating to a name, date of birth, address, and/or government identification number of the user 102. Thus, before allowing the user 102 to open the bank account, the requestor 120 may require that the user 102 share digital identity data relating to this information, such as digital identity attributes relating to the name, date of birth, address, and/or government identification number for the user 102. In addition, the one or more government regulations may compel the requestor 120 to verify, or at least be able to verify, the information relating to the name, date of birth, address, and/or government identification number of the user 102 using one or more physical identification documents, such as a passport, a government-issued driver's license, or a government-issued identification card. Thus, before allowing the user 102 to open the bank account, the requestor 120 may also require that the user 102 share evidence data corresponding to a passport, a government-issued driver's license, or a government-issued identification card for the user 102.

The regulator 130 may be used to facilitate a sharing of the evidence data of the user 102 with the requestor 120 via the compliance platform 150, as further explained below. The regulator 130 may be an individual, an entity, and/or the like. In some implementations, the regulator 130 may be independent from and/or unrelated to the user 102 and/or the requestor 120. In one implementation, the regulator 130 may be a regulatory entity, such as a government regulatory agency, an industry regulatory organization, and/or any other regulatory entity known to those skilled in the art. In one such implementation, the one or more rules and/or regulations mentioned above may specify that, for transactions between the user 102 and the requestor 120, the regulator 130 is to be a particular regulatory entity. In another such implementation, the regulator 130 may be the same regulatory entity that instituted the one or more rules and/or regulations mentioned above. For example, the regulator 130 may be a banking regulatory agency that regulates a country's banking institutions. In another implementation, the regulator 130 may be an escrow agent authorized to assist with the sharing of the evidence data with the requestor 120. In one such implementation, a contractual agreement between the user 102 and the requestor 120 may specify that the regulator 130 is to be a particular escrow agent.

The compliance platform 150 may be used to facilitate a sharing of the evidence data of the user 102 with the requestor 120. The sharing of the evidence data may occur in conjunction with a sharing of the digital identity data by the user 102 with the requestor 120 via the decentralized identity system. As further explained below, the compliance platform 150 may be used to share a compliance data package between the user 102 and the requestor 120 in order to facilitate a sharing of the evidence data of the user 102 with the requestor 120.

In some implementations, the compliance platform 150 may be operated by and/or provided by an entity, where the entity may be unrelated to the user 102, the requestor 120, the regulator 130, and/or the identity verification provider 140. In other implementations, the entity may be related to the identity verification provider 140. The compliance platform 150 may be a software-based system, a hardware-based system, or combinations thereof. In particular, the compliance platform 150 may include, and/or may be implemented using, one or more computing devices 151. The one or more computing devices 151 may include any computing device known to those skilled in the art, such as one or more servers. Various implementations of the one or more computing devices 151 are discussed later with respect to FIG. 2.

As further explained below, the compliance platform 150 may be configured to perform one or more operations described herein, including communicating with the user 102 (via the communications device 110), the requestor 120, and/or the regulator 130 using the one or more networks 105. In one implementation, as further explained below, the one or more operations may include: encrypting a compliance data package received from the user 102 using a first cryptographic key, where the compliance data package may include encrypted evidence data corresponding to the digital identity data of the user 102; generating a user key shard, a requestor key shard, and a regulator key shard based on the first cryptographic key; generating and encrypting an unlock data package that includes the requestor key shard; transmitting the user key shard, the encrypted unlock data package, and the encrypted compliance data package to the user 102; and/or transmitting the regulator key shard to the regulator 130. In another implementation, as further explained below, the one or more operations may include: receiving the encrypted unlock package from the requestor 120; transmitting regulator identifier data to the requestor 120; receiving the regulator key shard, the encrypted unlock package, and the encrypted compliance package from the requestor 120; and/or transmitting the encrypted evidence data to the requestor 120. In yet another implementation, as further explained below, the one or more operations may include: receiving the user key shard, the encrypted unlock package, and the encrypted compliance package from the requestor 120; and/or transmitting the encrypted evidence data to the requestor 120.

In one implementation, the user 102 may use the communications device 110 to perform one or more operations described herein, including communicating with the one or more computing devices of the requestor 120 and/or the compliance platform 150 via the one or more networks 105. In particular, the communications device 110 may be used to facilitate a sharing of the digital identity data and/or the compliance data package (i.e., the evidence data) between the user 102 and the requestor 120. In one implementation, as further explained below, the one or more operations may include: transmitting access request data to the requestor 120; receiving identity request data from the requestor 120; transmitting a compliance data package to the compliance platform 150, where the communications device 110 generated the compliance data package using encrypted evidence data of the user 102; receiving a user key shard, an encrypted unlock package, and an encrypted compliance package from the compliance platform 150; and/or transmitting the digital identity data, the encrypted unlock package, and the encrypted compliance package to the requestor 120. In another implementation, as further explained below, the one or more operations may include: transmitting evidence request data to the requestor 120; receiving user key request data from the requestor 120; transmitting the user key shard to the requestor 120; and/or receiving the evidence data from the requestor 120.

In another implementation, the user 102 may utilize the communications device 110 to store, manage, and/or share the digital identity data of the user 102 for use in the decentralized identity system, as further described below. In particular, the communications device 110 may be used to communicate with the one or more computing devices 141 of the identity verification provider 140 in order to receive digital identity data from the identity verification provider 140. In a further implementation, the user 102 may use the communications device 110 to control how the digital identity data is accessed and/or shared. In particular, the user 102 may use the communications device 110 to exert control over whether any of its digital identity data is shared, with whom its digital identity data is shared, and/or the like. In one such implementation, the digital identity data stored in the device 110 may have been issued by one or more issuers. In a further implementation, a digital wallet included in the communications device 110 may be used to store, manage, and/or share the digital identity data of the user 102.

The requestor 120 may also include one or more computing devices 121, such that the requestor 120 may own, operate, and/or be associated with the one or more computing devices 121. The one or more computing devices 121 may include any computing device known to those skilled in the art, such as one or more servers, one or more workstations, one or more personal computers, and/or one or more laptops. Various implementations of the one or more computing devices 121 are discussed later with respect to FIG. 2.

The one or more computing devices 121 may be configured to perform one or more operations described herein, including communicating with the user 102, the regulator 130, and/or the compliance platform 150 via the one or more networks 105. In particular, the one or more computing devices 121 may be used to facilitate a sharing of the digital identity data and/or the compliance data package (i.e., the evidence data) between the user 102 and the requestor 120. In one implementation, as further explained below, the one or more operations may include: receiving access request data from the user 102; transmitting identity request data to the user 102; and/or receiving digital identity data, an encrypted unlock package and an encrypted compliance package from the user 102. In another implementation, as further explained below, the one or more operations may include: transmitting the encrypted unlock package to the compliance platform 150; receiving regulator identifier data from the compliance platform 150; transmitting the regulator identifier data to the regulator 130; receiving the regulator key shard from the regulator 130; transmitting the regulator key shard, the encrypted unlock package, and the encrypted compliance package to the compliance platform 150; and/or receiving the encrypted evidence data from the compliance platform 150. In yet another implementation, as further explained below, the one or more operations may include: receiving evidence request data from the user 102; transmitting user key request data to the user 102; receiving the user key shard from the user 102; transmitting the user key shard, the encrypted unlock package, and the encrypted compliance package to the compliance platform 150; and/or receiving the encrypted evidence data from the compliance platform 150.

The regulator 130 may also include one or more computing devices 131, such that the regulator 130 may own, operate, and/or be associated with the one or more computing devices 131. The one or more computing devices 131 may include any computing device known to those skilled in the art, such as one or more servers, one or more workstations, one or more personal computers, and/or one or more laptops. Various implementations of the one or more computing devices 131 are discussed later with respect to FIG. 2. The one or more computing devices 131 may be configured to perform one or more operations described herein, including communicating with the requestor 120 and/or the compliance platform 150 via the one or more networks 105. In particular, the one or more computing devices 131 may be used to facilitate a sharing of the compliance data package (i.e., the evidence data) between the user 102 and the requestor 120. In one implementation, as further explained below, the one or more operations may include: receiving the regulator key shard from the compliance platform 150; receiving the regulator identifier data from the requestor 120; and/or transmitting the regulator key shard to the requestor 120.

The identity verification provider 140 may be an entity used for verifying the identity information (i.e., the identity) of the user 102, as further described below. In some implementations, the identity verification provider 140 may verify the identity information based on one or more proofs of identity corresponding to the user 102. As noted above, proof of identity may include any type of proof known to those skilled in the art, such as, for example, the one or more physical identification documents mentioned above. In one such implementation, the identity verification provider 140 may be an issuer in the decentralized identity system, such as the issuer described earlier. In particular, the identity verification provider 140 may issue digital identity data (e.g., one or more digital identity attributes and/or one or more digital credentials) corresponding to the user 102. By issuing the digital identity data, the identity verification provider 140 may be indicating that it has verified the data included in the issued digital identity data.

The identity verification provider 140 may also include one or more computing devices 141, such that the identity verification provider 140 may own, operate, and/or be associated with the one or more computing devices 141. The one or more computing devices 141 may include any computing device known to those skilled in the art, such as one or more servers. Various implementations of the one or more computing devices 141 are discussed later with respect to FIG. 2. As further explained below, the one or more computing devices 141 may be configured to perform one or more operations described herein, including communicating with the communications device 110 via the one or more networks 105. In some implementations, as explained below, the identity verification provider 140 may verify the identity information of the user 102 based on one or more quality factors for the one or more proofs of identity submitted by the user 102. The one or more quality factors may include any factor known to those skilled in the art, including, but not limited to, the following: image quality; image comparison; corroboration with one or more databases, such as those relating to social data, financial data, and/or mobile operator network data; evaluation using one or more machine learning algorithms; and/or the like. In another implementation, the identity verification provider 140 may be optional in the system 100.

The one or more computing devices mentioned above, including the communications device 110, may be configured to perform one or more operations as described herein using one or more applications downloaded to, installed in, and/or active in these one or more computing devices. In addition, the one or more computing devices mentioned above, including the communications device 110, may communicate with one another using any technique known to those skilled in the art. For example, though not shown in FIG. 1, these one or more computing devices may communicate with one another using one or more application programming interfaces (APIs) associated with the one or more applications. In another example, the one or more applications used by at least some of the computing devices may include a web browser, such that the web browser may be used to communicate with other computing devices of the system 100 via the one or more networks 105.

In some implementations, one or more entities associated with the requestor 120, the regulator 130, the identity verification provider 140, and/or the compliance platform 150 may provide at least some of the one or more applications used by the one or more computing devices mentioned above. For example, the one or more applications used by the communications device 110 may include a requestor application provided by an entity associated with the requestor 120, such that the communications device 110 may use this requestor application to communicate with the one or more computing devices 121 of the requestor 120. In other implementations, these one or more entities may provide one or more tools (e.g., software development kits) for use in developing, and/or adding functionalities to, at least some of the one or more applications used by the one or more computing devices mentioned above. In another implementation, at least some of the one or more applications used by the one or more computing devices mentioned above may be provided by an entity independent from and/or unrelated to these one or more entities. For example, the one or more applications used by the communications device 110 may include a digital wallet developed by an entity that is independent from and/or unrelated to the requestor 120, the identity verification provider 140, and/or the compliance platform 150.

Moreover, although the system 100 is presented in one arrangement, other implementations may include one or more elements of the system 100 in different arrangements and/or with additional elements. For example, though one requestor 120 is shown in FIG. 1, those skilled in the art will understand that the implementations described herein may be applied to a plurality of requestors 120. In another example, though one user 102 is shown in FIG. 1, those skilled in the art will understand that the implementations described herein may be applied to a plurality of users 102. In yet another example, the identity verification provider 140 and the compliance platform 150 may be combined into a single entity, such that the entity may perform the one or more operations described above for both the identity verification provider 140 and the compliance platform 150.

Figure 2:
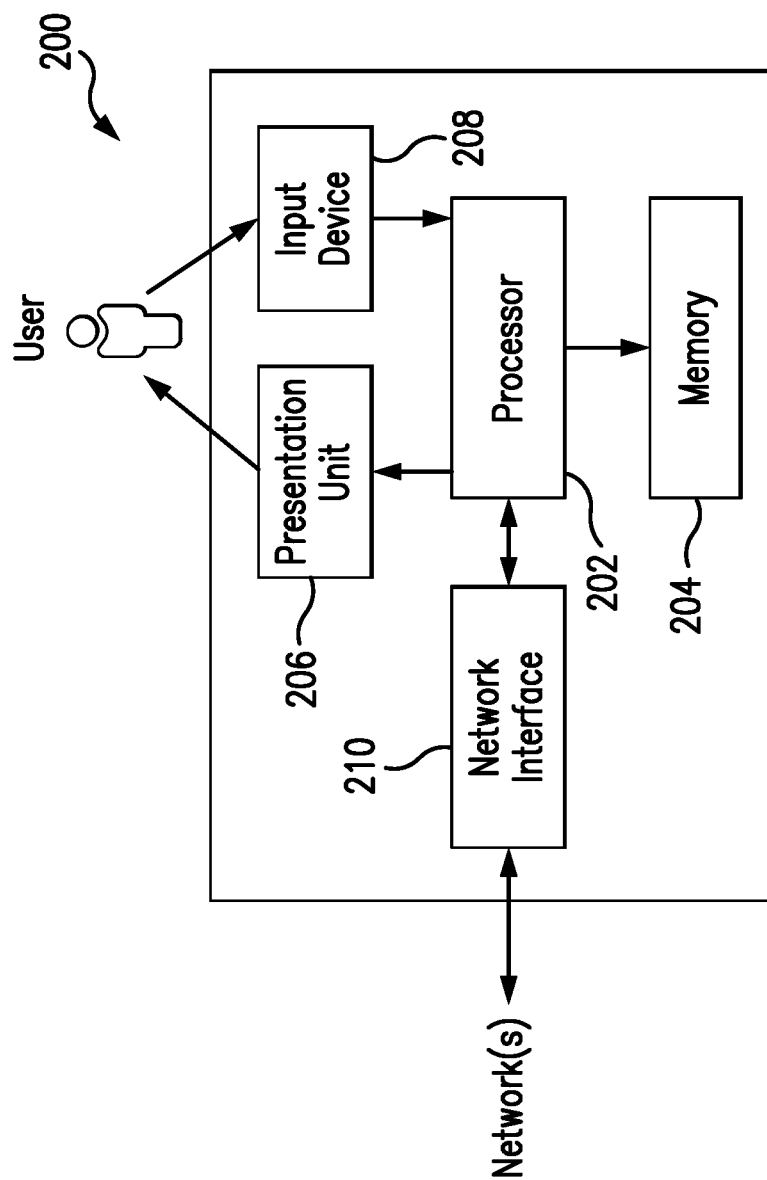
FIG. 2 illustrates a diagram of a computing device in which one or more various technologies described herein may be incorporated and practiced.

FIG. 2 illustrates a diagram of a computing device 200 in which one or more various technologies described herein may be incorporated and practiced. The computing device 200 may be any computing device known to those skilled in the art. For example, the computing device 200 may include one or more servers, workstations, personal computers, laptops, tablets, smartphones, personal digital assistants (PDAs), and/or the like. In one implementation, the computing device 200 may include a single computing device. In another implementation, the computing device 200 may include multiple computing devices located in close proximity and/or distributed over a geographic region, where the computing devices may be configured to function as described herein.

The computing device 200 can be used to implement one or more of the computing devices discussed above, such as the devices 110, 121, 131, 141, and 151. Those skilled in the art will understand that the system 100 may use different computing devices and/or arrangements of computing devices than those described with respect to FIG. 2. In addition, different components and/or arrangements of components may be used in other computing devices.

Referring to FIG. 2, the computing device 200 may include a processor 202 and a memory 204 coupled to and/or in communication with the processor 202. The processor 202 may include one or more processing units (e.g., in a multi-core configuration and/or the like). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, may include one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, images, private and/or public keys, public/private key pairs, identity records, certified and/or certification records, hashed data, signed data, one or more data structures, and/or other types of data suitable for use as described herein. Furthermore, in various implementations, computer-executable instructions may be stored in the memory 204 for execution by the processor 202 to cause the processor 202 to perform one or more of the functions described herein, such that the memory 204 may be a physical, tangible, and non-transitory computer readable storage media. Such instructions may be used to improve the efficiencies and/or performance of the processor 202 and/or other computer system components configured to perform one or more of the various operations herein. It should be appreciated that the memory 204 may include a variety of different memories, each implemented in one or more of the functions or processes described herein.

The computing device 200 may also include a presentation unit 206 that is coupled to and/or in communication with the processor 202. However, it should be appreciated that the computing device 200 could include output devices other than the presentation unit 206 and/or the like. The presentation unit 206 may output information to a user, such as by using a visual output. Further, one or more interfaces may be displayed at computing device 200, including at presentation unit 206, to display certain information. The one or more interfaces may be defined by the one or more applications mentioned above, defined by websites, defined by mobile applications, and/or the like. In addition, the one or more interfaces may be used to capture images of documents, capture selfies, capture biometrics, and/or the like. The presentation unit 206 may include, without limitation, a liquid crystal display (LCD), a light-emitting diode (LED) display, an organic LED (OLED) display, an "electronic ink" display, speakers, and/or the like. In some implementations, the presentation unit 206 may include multiple devices.

In addition, the computing device 200 may include an input device 208 configured to receive and/or acquire one or more inputs from a user (i.e., user inputs), such as in response to prompts from the one or more applications described above. The one or more inputs may include images of documents, images of a user (e.g., biometric data), and/or the like. The input device 208 may include a single input device or multiple input devices. The input device 208 may be coupled to and/or in communication with the processor 202. The input device 208 may include, for example, a keyboard, a pointing device, a mouse, a stylus, a camera, fingerprint scanner, a touch sensitive panel (e.g., a touch pad, a touch screen, and/or the like), acquisition equipment as described above, another computing device, an audio input device, or combinations thereof. In one implementation, a touch screen, such as that included in a tablet, a smartphone, or similar device, may behave as both a presentation unit and an input device. As mentioned above, the computing device may include and/or configured to be coupled to any equipment used to acquire one or more images of documents and/or biometric data. Such equipment may include a camera, a biometric sensor (e.g., fingerprint sensor, iris scanner, palm scanner, and/or the like), and/or any other device configured to acquire such data.

Further, the illustrated computing device 200 may include a network interface 210 coupled to and/or in communication with the processor 202 and the memory 204. The network interface 210 may include, without limitation, a wired network adapter, a wireless network adapter (e.g., a near field communication (NFC) adapter, a Bluetooth adapter, and/or the like), a mobile network adapter, and/or other devices capable of communicating to one or more different devices of the networks described herein. Further, in some implementations, the computing device 200 may include the processor 202 and one or more network interfaces incorporated into or with the processor 202. In some implementations, the computing device 200 may include global positioning system (GPS) capability, whereby the computing device 200 may determine its current geographic location, perform mapping applications, and/or the like.

B. Operation

One or more elements of the system 100 (e.g., the compliance platform 150) may be used to, at least partially, perform one or more operations, such as those described below, to facilitate a sharing of the evidence data of the user 102 with the requestor 120. In particular, the system 100 may facilitate the sharing of the evidence data by using the compliance platform 150 to share a compliance data package between the user 102 and the requestor 120. Further, the one or more elements of the system 100 may use the one or more computing devices mentioned above, including the communications device 110, to, at least partially, perform the one or more operations. The one or more computing devices may also use the one or more applications mentioned above to, at least partially, perform the one or more operations.

1. Acquiring Digital Identity Data

In one implementation, prior to an interaction between the user 102 and the requestor 120, the user 102 may use the communications device 110 to acquire digital identity data. As noted above, the digital identity data of the user 102 may include one or more digital identity attributes and/or one or more digital credentials. In addition, the digital identity data may include other data relating to the digital identity of the user 102, such as a unique user identifier, a unique user public-private key pair, and/or the like.

In one such implementation, the user 102 may use one or more applications of the communications device 110 to request digital identity data. In particular, the user 102 may use the one or more applications to request that the identity verification provider (IVP) 140 provide the digital identity data. In such an implementation, the IVP 140 may be an issuer, as described above. For example, an application (e.g., a digital wallet) may use a presentation unit of the communications device 110 to display a prompt to the user 102, where the prompt indicates an option to request digital identity data. The user 102 may then use an input device of the communications device 110 to provide a response to the application, where the response indicates that the user 102 requests the digital identity data.

In response to the request from the user 102, the one or more applications may create the user identifier and the user public-private key pair for the user 102 using any technique known to those skilled in the art. The one or more applications may store the user private key of the user public-private key pair in a memory of the device 110. In a further implementation, the one or more applications may also store the user identifier and/or the user public key of the user public-private key pair in the memory of the device 110.

The communications device 110, through the one or more applications, may display a prompt indicating that the user 102 is to use the device 110 to capture one or more images of one or more physical identification documents of the user 102. As noted above, the one or more physical identification documents may include a passport, a government-issued driver's license, a government-issued identification card, a social security card, a health insurance card, a bank statement, an employee identification card, a library card, a utility bill, and/or the like. The device 110 may capture the one or more images using one or more input devices included in and/or in communication with the device 110, where the one or more input devices may include a camera, a scanner, and/or any other input device known to those skilled in the art. In some implementations, the one or more images may include images corresponding to multiple physical identification documents. After capturing the one or more images, the device 110 may (via the one or more applications) generate image data based on the one or more images. In some implementations, the device 110 may (via the one or more applications) then store the image data in the memory of the device 110. The stored image data may be used later as evidence data for the user 102, as further explained below.

In one implementation, the communications device 110, through its one or more applications, may transmit the image data to the one or more computing devices 141 of IVP 140 for use in an identity verification of the user 102. The device 110 may also transmit the user identifier to the one or more computing devices 141 of the IVP 140. The IVP 140 may use the one or more computing devices 141 to verify the user's identity based on the image data using any technique known to those skilled in the art. In one such implementation, the IVP 140 may derive identity information from the received image data and then verify the identity information. In particular, the IVP 140 may verify the identity information based on one or more quality factors, where such factors may include, but are not limited to, the following: image quality; image comparison; corroboration with one or more databases, such as those relating to social data, financial data, and/or mobile operator network data; evaluation using one or more machine learning algorithms; and/or the like.

The IVP 140, using its one or more computing devices 141, may transmit a verification result for the user 102 to the communications device 110. If the IVP 140 successfully verifies the identity information of the user 102, then the IVP 140, using its one or more computing devices 141, may also issue the digital identity data for the user 102 corresponding to the verified identity information, where the issued digital identity data may include one or more issued digital identity attributes and/or one or more issued digital credentials. As explained above, by issuing the digital identity data, the IVP 140 may be attesting that it has taken one or more actions to confirm the veracity of the digital identity data.

In particular, the IVP 140 may transmit the issued digital identity data to the communications device 110, and the device 110 may then use its one or more applications to store the digital identity data in the memory of the device 110. In one example, the digital identity data may be stored in, and managed using, a digital wallet of the device 110. Upon successfully storing the digital identity data in the memory, the device 110 may use its one or more applications to display a prompt to the user 102 indicating that the digital identity data was successfully received. In further implementations, the IVP 140 and/or the user 102 may also store the digital identity data in a ledger data structure, as described earlier.

2. Providing Compliance Data Package

After successfully acquiring the issued digital identity data, the user 102 may attempt to access the one or more resources provided by and/or managed by the requestor 120. In one implementation, the user 102 may use the one or more applications of the communications device 110 to transmit access request data to the requestor 120. The access request data may include data that indicates that the user 102 seeks permission from the requestor 120 for access to the one or more resources. In particular, using the device 110, the user 102 may transmit the access request data to the one or more computing devices 121 of the requestor 120. In one example, an individual (i.e., the user 102) may seek to open a bank account with a banking institution (i.e., the requestor 120). The individual may use a requestor application and/or a digital wallet on his smartphone (i.e., the device 110) to transmit access request data to a server (i.e., one or more computing devices 121) of the banking institution, where the access request data includes data indicating that the individual seeks to open the bank account with the banking institution.

After receiving the access request data, the requestor 120 may use its one or more computing devices 121 to transmit identity request data to the communications device 110. The identity request data may include data that indicates a request for the user 102 to share at least a portion of its digital identity data via the decentralized identity system. In one such implementation, the requested portion of the digital identity data of the user 102 may include one or more specific digital identity attributes and/or one or more specific digital credentials. For example, the requestor 120 may be a banking institution and may ask the user 102 to share digital identity attributes relating to a name, date of birth, address, and/or government identification number for the user 102.

The identity request data sent from the requestor 120 may also include data that indicates a request for the user 102 to provide a compliance data package, where the compliance data package may include encrypted evidence data that can be used to verify the requested digital identity data. Thus, by providing the compliance data package, the user 102 may at least be providing access to evidence data that can be used by the requestor 120 to corroborate the requested digital identity data. As explained above, in some implementations, the requestor 120 may request the compliance data package in order to comply with one or more rules and/or regulations. For example, the requestor 120 may be a banking institution, where, before allowing an individual (i.e., the user 102) to open a bank account, the banking institution may be required to conduct a KYC process in accordance with one or more government regulations. The one or more government regulations may require that the banking institution be able to acquire evidence data (e.g., via the compliance data package) that can verify identity information relating to a name, date of birth, address, and/or government identification number for the individual.

In addition, the identity request data sent from the requestor 120 may also include regulator endpoint data. The regulator endpoint data may include data relating to the regulator 130, such as data indicating an endpoint (e.g., a Uniform Resource Locator (URL)) of the regulator 130, a name of the regulator 130, contact information for the regulator 130, and/or the like. As explained above, the regulator 130 may be a regulatory entity, an escrow agent, and/or the like. In a further implementation, the identity request data sent from the requestor 120 may also include a requestor public key of a requestor public-private key pair. The requestor public-private key pair may have been generated for the requestor 120 using any technique known to those skilled in the art.

In response to receiving the identity request data, the communications device 110 may use its one or more applications to display a prompt to the user 102 via the presentation unit of the device 110, where the prompt indicates that the requestor 120 is requesting access to the requested digital identity data and is also requesting that the user 102 provide the compliance data package. The user 102 may use an input device of the device 110 to provide a response to the one or more applications, where the response indicates that the user 102 consents to sharing the requested digital identity data with the requestor 120 and to providing the compliance data package to the requestor 120.

The communications device 110 may then use its one or more applications to generate the compliance data package. The compliance data package may be generated using evidence data, where the evidence data can be used to verify the digital identity data to be shared with the requestor 120. The user 102 may provide the device 110 with the evidence data using any technique known to those skilled in the art. In one implementation, the evidence data may include the image data previously stored in the memory of the device 110. In another implementation, the device 110 may, in a similar manner as described above, further capture one or more images of one or more physical identification documents of the user 102 for use as the evidence data.

The compliance data package may include encrypted evidence data and a user signature. In one implementation, the communications device 110 may use its one or more applications to generate both the encrypted evidence data and the user signature. The communications device 110 may generate the encrypted evidence data by encrypting the evidence data using the requestor public key that was previously received via the identity request data. In other implementations, the device 110 may obtain the requestor public key using any other technique known to those skilled in the art, such as by using a public database. In addition, the device 110 may generate the user signature based on the evidence data. In particular, the device 110 may generate the user signature by producing a mathematical representation of the evidence data using an algorithm and then encrypting the mathematical representation using the user private key. For example, the device 110 may generate the user signature by producing a hash value (i.e., the mathematical representation) of the encrypted evidence data using a one-way hash algorithm (e.g., Secure Hash Algorithm (SHA), or the like) and then encrypting the hashed value using the user private key. As noted above, the user private key may be stored in the memory of the device 110. After generating both the encrypted evidence data and the user signature, the communications device 110 may then use its one or more applications to generate the compliance data package by creating a data package and then adding the encrypted evidence data and the user signature to the data package.

Once the compliance data package has been generated, the communications device 110 may use its one or more applications to transmit the compliance data package to the compliance platform 150 (i.e., to the one or more computing devices 151). The device 110 may also use its one or more applications to transmit the regulator endpoint data (received from the requestor 120) to the compliance platform 150. In a further implementation, the device 110 may also use its one or more applications to transmit signature details data to the compliance platform 150. The signature details data may include data relating to the user signature generated by the device 110. Such data may include data relating to the algorithm used to generate the user signature (e.g., data corresponding to a hash algorithm, data indicating where to obtain the hash algorithm, and/or the like), data relating to the user public key mentioned above (e.g., data corresponding to the user public key, data indicating where to obtain the user public key, and/or the like), or combinations thereof.

After receiving the data (e.g., the compliance data package, the regulator endpoint data, and the signature details data) from the communications device 110, the compliance platform 150 may use its one or more computing devices 151 to generate an encrypted compliance data package and an encrypted unlock data package, as described below.

In particular, in one implementation, after receiving the data from the device 110, the compliance platform 150 may use its one or more computing devices 151 to generate a regulator identifier. The regulator identifier may be used by the regulator 130 to keep track of a transaction between the user 102 and the requestor 120, as described later. In a further implementation, the compliance platform 150 may create the regulator identifier based on the regulator endpoint data (received from the device 110), such that the regulator identifier may correspond to the regulator 130 indicated by the regulator endpoint data.

In addition, after receiving the data from the device 110, the compliance platform 150 may use its one or more computing devices 151 to generate a first cryptographic key. The compliance platform 150 may create the first cryptographic key using any technique known to those skilled in the art. The first cryptographic key may be any type of cryptographic key known to those skilled in the art, including any symmetric key or any asymmetric key. The first cryptographic key may also be referred to herein as a sharding key, and these terms may be used interchangeably hereinafter. The compliance platform 150 may then, via the one or more computing devices 151, encrypt the compliance data package (received from the device 110) using the first cryptographic key, thereby generating the encrypted compliance data package.

Upon generating the encrypted compliance data package, the compliance platform 150 may use its one or more computing devices 151 to generate a plurality of key shards based on the first cryptographic key. The plurality of key shards may include a user key shard, a requestor key shard, and a regulator key shard. In one implementation, the compliance platform 150 may generate the plurality of key shards by sharding the first cryptographic key using any sharding technique known to those skilled in the art. In one such implementation, the compliance platform 150 may split the first cryptographic key into three key shards (e.g., the user key shard, the requestor key shard, and the regulator key shard), such that any two of the key shards, at minimum, may be used to reconstruct the first cryptographic key.

After generating the key shards, the compliance platform 150 may use its one or more computing devices 151 to generate an unlock data package. The unlock data package may include the requestor key shard, the regulator identifier, and the signature details data (received from the device 110). In one implementation, the compliance platform 150 may generate the unlock data package by creating a data package and then adding the requestor key shard, the regulator identifier, and the signature details data to the data package.

After generating the unlock data package, the compliance platform 150 may use its one or more computing devices 151 to encrypt the unlock data package using a platform public key of a platform public-private key pair, thereby generating the encrypted unlock data package. The platform public-private key pair may have been generated for the compliance platform 150 using any technique known to those skilled in the art. In some implementations, the platform private key and/or the platform public key may be stored in a memory associated with the one or more computing devices 151.

The compliance platform 150 may then use its one or more computing devices 151 to transmit the user key shard, the encrypted unlock data package, and the encrypted compliance data package to the communications device 110. In response, the communications device 110 may use its one or more applications to store the user key shard, the encrypted unlock data package, and/or the encrypted compliance data package in the memory of the device 110. In one such implementation, the device 110 may include the user key shard, the encrypted unlock data package, and/or the encrypted compliance data package as part of the digital identity data of the user 102. For example, the device 110 may store and/or manage the user key shard, the encrypted unlock data package, and/or the encrypted compliance data package using a digital wallet of the device 110.

The communications device 110 may use its one or more applications to transmit the requested digital identity data of the user 102, the encrypted unlock data package, and the encrypted compliance data package to the requestor 120. As noted above, the requested digital identity data may correspond to the digital identity data indicated by the identity request data (previously received from the requestor 120). After receiving the data from the communications device 110, the requestor 120 may use its one or more computing devices 121 to store the received digital identity data, the encrypted unlock data package, and the encrypted compliance data package in an associated memory of the one or more devices 121.

In addition, the compliance platform 150 may use its one or more computing devices 151 to transmit the regulator key shard and the regulator identifier to the regulator 130. In one implementation, compliance platform 150 may transmit the regulator key shard and the regulator identifier to the regulator 130 (i.e., to the one or more computing devices 131) based on the regulator endpoint data (previously received from the communications device 110). For example, the compliance platform 150 may transmit the regulator key shard and the regulator identifier to the regulator 130 using the URL indicated in the regulator endpoint data. The regulator 130 may use its one or more computing devices 131 to store the regulator key shard and the regulator identifier in an associated memory of the one or more devices 131.

In some implementations, after receiving and storing the digital identity data shared by the user 102, the requestor 120 may be able to verify the digital identity data via the decentralized identity system, as described earlier. In one such implementation, the requestor 120 may verify the digital identity data by confirming that the data (i.e., one or more digital identity attributes and/or one or more digital credentials) was actually issued by one or more issuers (e.g., the IVP 140). For example, as explained above, the requestor 120 may use a ledger data structure to confirm that the digital identity data was issued by one or more issuers.

However, in other implementations, the requestor 120 may attempt to verify the digital identity data using the encrypted compliance data package stored in the memory of its one or more computing devices 121. In one implementation, the requestor 120 may attempt to verify the digital identity data using the encrypted compliance data package in instances in which the requestor 120 suspects that the user 102 has defrauded the requestor 120. In another implementation, the requestor 120 may be required by one or more rules and/or regulations to verify the digital identity data using the evidence data of the encrypted compliance data package. For example, a banking institution (i.e., the requestor 120) may be required by a government regulation to periodically verify the digital identity data shared by an individual (i.e., the user 102) based on, at least, image data of the individual's passport, government-issued driver's license, or government-issued identification card (e.g., the evidence data). The image data may be included in an encrypted compliance data package stored in a memory of a server (i.e., the one or more computing devices 121) associated with the banking institution.

3. Obtaining Evidence Data Using Regulator

In some implementations, as further described below, the requestor 120 may use the regulator 130 and the compliance platform 150 to obtain the evidence data from the encrypted compliance data package stored in the memory of the one or more computing devices 121. The requestor 120 may then be able to verify, or attempt to verify, the digital identity data of the user 102 via the obtained evidence data.

Initially, in one implementation, the requestor 120 may use the compliance platform 150 to obtain the regulator identifier from the encrypted unlock data package stored in the memory of the one or more computing devices 121. In one such implementation, the requestor 120 may use its one or more computing devices 121 to transmit the encrypted unlock data package to the compliance platform 150. In a further implementation, the requestor 120 may use its one or more computing devices 121 to also transmit identifier request data to the compliance platform 150. The identifier request data may include data that indicates a request for the compliance platform 150 to provide the regulator identifier to the requestor 120, such as by obtaining the regulator identifier from the encrypted unlock data package sent with the identifier request data.

Upon receiving the encrypted unlock data package and/or the identifier request data, the compliance platform 150 may use its one or more computing devices 151 to retrieve the regulator identifier from the encrypted unlock data package. In particular, the compliance platform 150 may use its platform private key to decrypt the received encrypted unlock data package. As noted above, the platform private key may be stored in a memory associated with the one or more computing devices 151. The compliance platform 150 may then retrieve the regulator identifier from the decrypted unlock data package. After retrieving the regulator identifier, the compliance platform 150 may use its one or more computing devices 151 to transmit the regulator identifier to the requestor 120.

In response to receiving the regulator identifier, the requestor 120 may use the regulator identifier to obtain the regulator key shard from the regulator 130. In one implementation, the requestor 120 may use its one or more computing devices 121 to transmit the regulator identifier to the regulator 130. In a further implementation, the requestor 120 may use its one or more computing devices 121 to also transmit regulator key request data to the regulator 130. The regulator key request data may include data that indicates a request for the regulator 130 to provide the regulator key shard to the requestor 120. Upon receiving the regulator identifier and/or the regulator key request data, the regulator 130 may use its one or more computing devices 131 to retrieve the regulator key shard using the regulator identifier. In particular, the one or more computing devices 131 may retrieve the regulator key shard from the associated memory in which it is stored using the regulator identifier, such as by searching and/or querying the memory using the regulator identifier. After retrieving the regulator key shard, the regulator 130 may use its one or more computing devices 131 to transmit the regulator key shard to the requestor 120.

In response to receiving the regulator key shard, the requestor 120 may use the compliance platform 150 to obtain the encrypted evidence data from the encrypted compliance data package stored in the memory of the one or more computing devices 121. In one implementation, the requestor 120 may use its one or more computing devices 121 to transmit the regulator key shard, the encrypted unlock data package, and the encrypted compliance data package to the compliance platform 150. In a further implementation, the requestor 120 may use its one or more computing devices 121 to also transmit evidence request data to the compliance platform 150. The evidence request data may include data that indicates a request for the compliance platform 150 to provide the encrypted evidence data to the requestor 120, such as by obtaining the encrypted evidence data from the encrypted compliance data package sent with the evidence request data.

Upon receiving the regulator key shard, the encrypted unlock data package, the encrypted compliance data package, and/or the evidence request data, the compliance platform 150 may use its one or more computing devices 151 to retrieve the requestor key shard from the encrypted unlock data package. In particular, the compliance platform 150 may use the platform private key (as described above) to decrypt the received encrypted unlock data package. The compliance platform 150 may then retrieve the requestor key shard from the decrypted unlock data package. Further, the compliance platform 150 may also retrieve the signature details data from the decrypted unlock data package.

Subsequently, the compliance platform 150 may use its one or more computing devices 151 to reconstruct the first cryptographic key using the regulator key shard (received from the requestor 120) and the requestor key shard. As noted above, the first cryptographic key may be sharded in such a manner that any two key shards can be used to reconstruct the first cryptographic key. After reconstructing the first cryptographic key, the compliance platform 150 may use its one or more computing devices 151 to decrypt the encrypted compliance data package (received from the requestor 120) using the reconstructed first cryptographic key.

The compliance platform 150 may use its one or more computing devices 151 to then retrieve the user signature and the encrypted evidence data from the decrypted compliance data package. Using the signature details data retrieved from the decrypted unlock data package, the compliance platform 150 may validate the user signature using any technique known to those skilled in the art. For example, the compliance platform 150 may decrypt the user signature using the user public key of the signature details data. The compliance platform 150 may then apply the hashing algorithm of the signature details to the retrieved encrypted evidence data, which may produce a new hashed value. The compliance platform may compare the decrypted user signature with the new hashed value. If the comparison yields a match, then compliance platform 150 may deem the user signature to be validated.

After successfully validating the user signature, the compliance platform 150 may use its one or more computing devices 151 to transmit the encrypted evidence data (retrieved from the decrypted compliance data package) to the requestor 120. In response to receiving the encrypted evidence data, the requestor 120 may use its one or more computing devices 121 to decrypt the encrypted evidence data using its requestor private key, thereby yielding the decrypted evidence data. As noted above, the requestor public-private key pair may have been generated for the requestor 120 using any technique known to those skilled in the art.

As a result, using the above described interactions with the regulator 130 and the compliance platform 150, the requestor 120 may be able to obtain the evidence data from the encrypted compliance data package and then use the evidence data to verify the digital identity data provided by the user 102. Thus, in some implementations, the requestor 120 may be able to verify the digital identity data provided by the user 102 using the encrypted compliance data package stored in the memory of its one or more computing devices 121. For example, the requestor 120 may suspect that the user 102 has defrauded the requestor 120 using false identity information. In such an example, the requestor 120 may be able to, using the regulator 130 and the compliance platform 150, verify the digital identity data provided by the user 102 using the encrypted compliance data package.

4. Obtaining Evidence Data Using User

In other implementations, as further described below, the requestor 120 may use the user 102 and the compliance platform 150 to obtain the evidence data from the encrypted compliance data package stored in the memory of the one or more computing devices 121. In one such implementation, the requestor 120 may obtain the evidence data in response to a request from the user 102. For example, for security purposes, the user 102 may seek to review the evidence data being held by the requestor 120.

Initially, in one implementation, the user 102 may use the one or more applications of its communications device 110 to transmit user evidence request data to the requestor 120. The user evidence request data may include data that indicates a request for the requestor 120 to obtain the evidence data from the encrypted compliance data package held by the requestor (e.g., stored in an associated memory of the one or more computing devices 121) and for the requestor 120 to transmit this evidence data to the user 102.

In response, the requestor 120 may use its one or more computing devices 121 to transmit user key request data to the communications device 110 of the user 102. The user key request data may include data that indicates a request for the user 102 to provide the user key shard to the requestor 120. As noted above, the user key shard may be included with the digital identity data of the user 102 that is stored in the communications device 110.

In response to receiving the user key request data, the communications device 110 may use its one or more applications to display a prompt to the user 102 via the presentation unit of the device 110, where the prompt indicates that the requestor 120 is requesting access to the user key shard. The user 102 may use an input device of the device 110 to provide a response to the one or more applications, where the response indicates that the user 102 consents to sharing the user key shard with the requestor 120. The communications device 110 may then use its one or more applications to transmit the user key shard to the requestor 120.

In response to receiving the user key shard, the requestor 120 may use the compliance platform 150 to obtain the encrypted evidence data from the encrypted compliance data package stored in the memory of the one or more computing devices 121. In one implementation, the requestor 120 may use its one or more computing devices 121 to transmit the user key shard, the encrypted unlock data package, and the encrypted compliance data package to the compliance platform 150. In a further implementation, the requestor 120 may use its one or more computing devices 121 to also transmit the evidence request data (as described above) to the compliance platform 150.

Upon receiving the user key shard, the encrypted unlock data package, the encrypted compliance data package, and/or the evidence request data, the compliance platform 150 may use its one or more computing devices 151 to retrieve the requestor key shard from the encrypted unlock data package. In particular, the compliance platform 150 may use the platform private key (as described above) to decrypt the received encrypted unlock data package. The compliance platform 150 may then retrieve the requestor key shard from the decrypted unlock data package. Further, the compliance platform 150 may also retrieve the signature details data from the decrypted unlock data package.

Subsequently, the compliance platform 150 may use its one or more computing devices 151 to reconstruct the first cryptographic key using the user key shard (received from the requestor 120) and the requestor key shard. As noted above, the first cryptographic key may be sharded in such a manner that any two key shards can be used to reconstruct the first cryptographic key. After reconstructing the first cryptographic key, the compliance platform 150 may use its one or more computing devices 151 to decrypt the encrypted compliance data package (received from the requestor 120) using the reconstructed first cryptographic key.

The compliance platform 150 may use its one or more computing devices 151 to then retrieve the user signature and the encrypted evidence data from the decrypted compliance data package. Using the signature details data retrieved from the decrypted unlock data package, the compliance platform 150 may validate the user signature using any technique known to those skilled in the art, such as in a similar manner as described above.

After successfully validating the user signature, the compliance platform 150 may use its one or more computing devices 151 to transmit the encrypted evidence data (retrieved from the decrypted compliance data package) to the requestor 120. In response to receiving the encrypted evidence data, the requestor 120 may use its one or more computing devices 121 to decrypt the encrypted evidence data using its requestor private key (as described above), thereby yielding the decrypted evidence data.

As a result, using the above described interactions with the user 102 and the compliance platform 150, the requestor 120 may be able to obtain the evidence data from the encrypted compliance data package. In turn, the requestor 120 may use its one or more computing devices 121 to transmit the evidence data to the communications device 110. The user 102 may then be able to obtain a copy of and/or review the evidence data held by the requestor 120 (i.e., included in the encrypted compliance data package stored in a memory of the one or more computing devices 121). For example, the device 110 may use its one or more applications to display the evidence data to the user 102 (e.g., using the presentation unit of the device 110), such that the user 102 may be able to visually review the evidence data.

As described above, in various implementations, the requestor 120 may use the compliance platform 150 to obtain the evidence data of the user 102. In particular, the requestor 120 may obtain a key shard from the user 102 or the regulator 130 and then provide this key shard to the compliance platform 150 in order to receive the encrypted evidence data from the compliance platform 150. In a further implementation, the compliance platform 150 may refuse to provide the encrypted evidence data to the requestor 120 if a number of requests for encrypted evidence data by the requestor 120 (e.g., transmissions of evidence request data by the requestor 120) is greater than or equal to a predetermined number for a predetermined time range. In one such implementation, the predetermined number may correspond to a maximum number of requests for encrypted evidence data by the requestor 120 for a particular user 102 within the predetermined time range. In another such implementation, the predetermined number may correspond to a maximum number of requests for encrypted evidence data by the requestor 120 for all users within the predetermined time range. The predetermined time range may be any length of time, such as one month, six months, one year, and/or the like. In some implementations, the predetermined number and/or the predetermined time range may be determined, at least in part, by the regulator 130. By limiting a number of requests for encrypted evidence data by the requestor 120, the compliance platform 150 may be able to prevent the requestor 120 and/or the regulator 130 from using coercion and/or corruption to obtain the evidence data for one or more users.

Those skilled in the art will understand that implementations of the system 100 may perform more, fewer, or different operations than those described above. Further, although operations above are discussed with respect to one arrangement of the system 100, those skilled in the art will understand that operation may be performed for other arrangements of the system 100 and/or with additional elements. For example, though one requestor 120 is shown in FIG. 1, those skilled in the art will understand that the implementations described herein may be applied to a plurality of requestors 120. In another example, though one user 102 is shown in FIG. 1, those skilled in the art will understand that the implementations described herein may be applied to a plurality of users 102. In yet another example, the identity verification provider 140 and the compliance platform 150 may be combined into a single entity, such that the entity may perform the one or more operations described above for both the identity verification provider 140 and the compliance platform 150.

Figure 3:
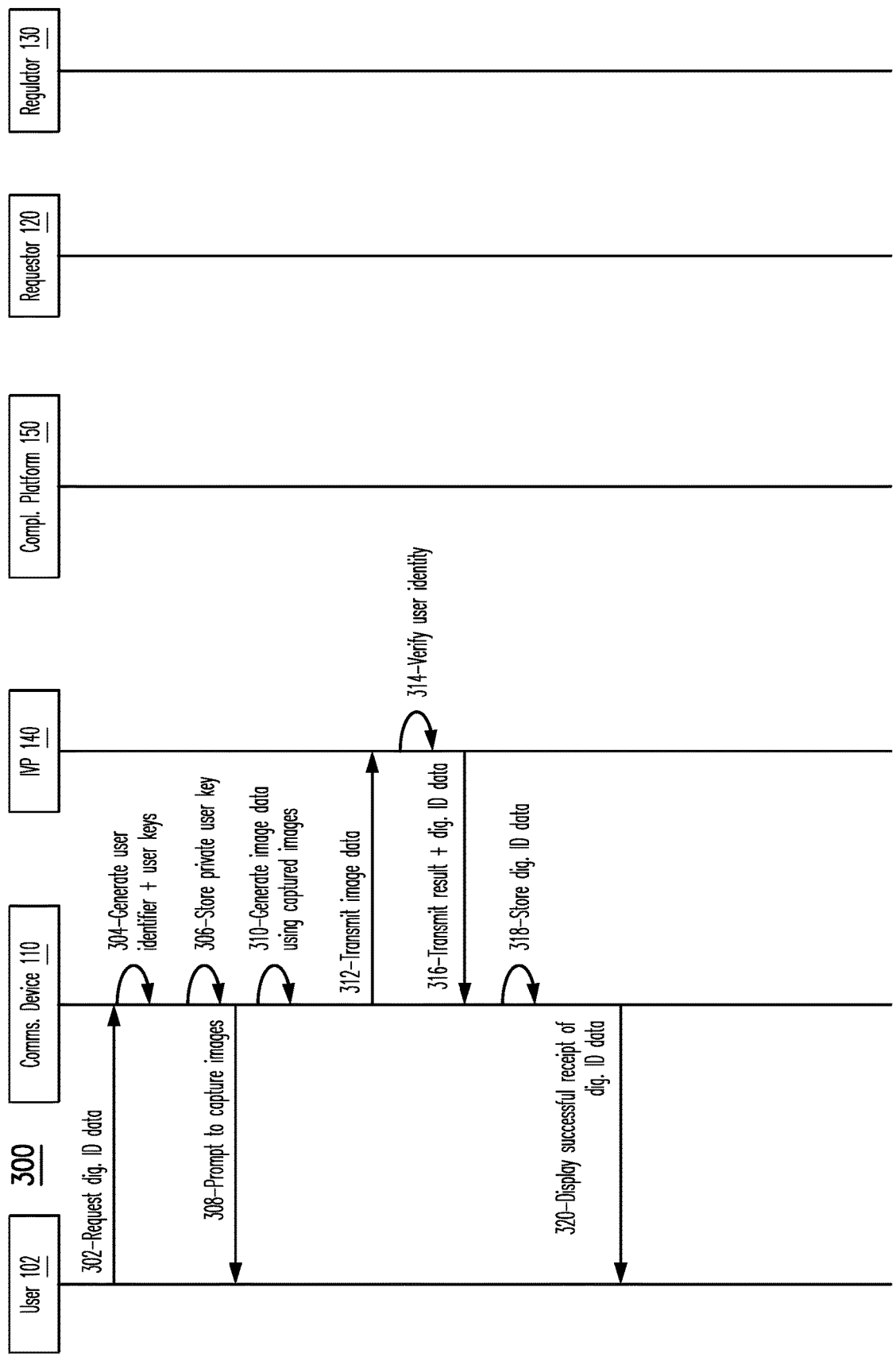
FIGS. 3-6 illustrate sequencing diagrams in accordance with implementations of various techniques described herein.

FIG. 3 illustrates a sequencing diagram 300 in accordance with implementations of various techniques described herein. In particular, the sequencing diagram 300 may represent an implementation of a process by the system 100, where the system 100 may be used by the user 102 to acquire digital identity data. While the sequencing diagram is discussed with respect to FIGS. 1 and 2, those skilled in the art will understand that implementations may not limited to the operation and/or system discussed below.

As stated above, prior to an interaction between the user 102 and the requestor 120, the user 102 may use the communications device 110 to acquire digital identity data. The digital identity data of the user 102 may include one or more digital identity attributes and/or one or more digital credentials. In addition, the digital identity data may include other data relating to the digital identity of the user 102, such as a unique user identifier, a unique user public-private key pair, and/or the like.

In one implementation, the user 102 may use one or more applications of the communications device 110 to request the digital identity data. In particular, the one or more applications may use a presentation unit of the communications device 110 to display a prompt to the user 102, where the prompt indicates an option to request digital identity data. At 302, the user 102 may use an input device of the communications device 110 to provide a response to the application, where the response indicates that the user 102 requests the digital identity data.

At 304, in response to the request from the user 102, the one or more applications may create the user identifier and the user public-private key pair for the user 102 using any technique known to those skilled in the art. At 306, the one or more applications may store the user private key of the user public-private key pair in a memory of the device 110.

At 308, the communications device 110, through the one or more applications, may display a prompt indicating that the user 102 is to use the device 110 to capture one or more images of one or more physical identification documents of the user 102. As noted above, the one or more physical identification documents may include a passport, a government-issued driver's license, a government-issued identification card, a social security card, a health insurance card, a bank statement, an employee identification card, a library card, a utility bill, and/or the like. At 310, the device 110 may capture the one or more images using one or more input devices included in and/or in communication with the device 110, where the one or more input devices may include a camera, a scanner, and/or any other input device known to those skilled in the art. After capturing the one or more images, the device 110 may (via the one or more applications) generate image data based on the one or more images. In some implementations, the device 110 may (via the one or more applications) then store the image data in the memory of the device 110.

At 312, the communications device 110, through its one or more applications, may transmit the image data to the one or more computing devices 141 of IVP 140 for use in an identity verification of the user 102. The device 110 may also transmit the user identifier to the one or more computing devices 141 of the IVP 140. At 314, the IVP 140 may use the one or more computing devices 141 to verify the user's identity based on the image data using any technique known to those skilled in the art.

At 316, the IVP 140, using its one or more computing devices 141, may transmit a verification result for the user 102 to the communications device 110. If the IVP 140 successfully verifies the identity information of the user 102, then the IVP 140, using its one or more computing devices 141, may also issue the digital identity data for the user 102 corresponding to the verified identity information, where the issued digital identity data may include one or more issued digital identity attributes and/or one or more issued digital credentials.

In particular, the IVP 140 may transmit the issued digital identity data to the communications device 110, and the device 110 may then, at 318, use its one or more applications to store the digital identity data in the memory of the device 110. At 320, upon successfully storing the digital identity data in the memory, the device 110 may use its one or more applications to display a prompt to the user 102 indicating that the digital identity data was successfully received.

Figure 4:
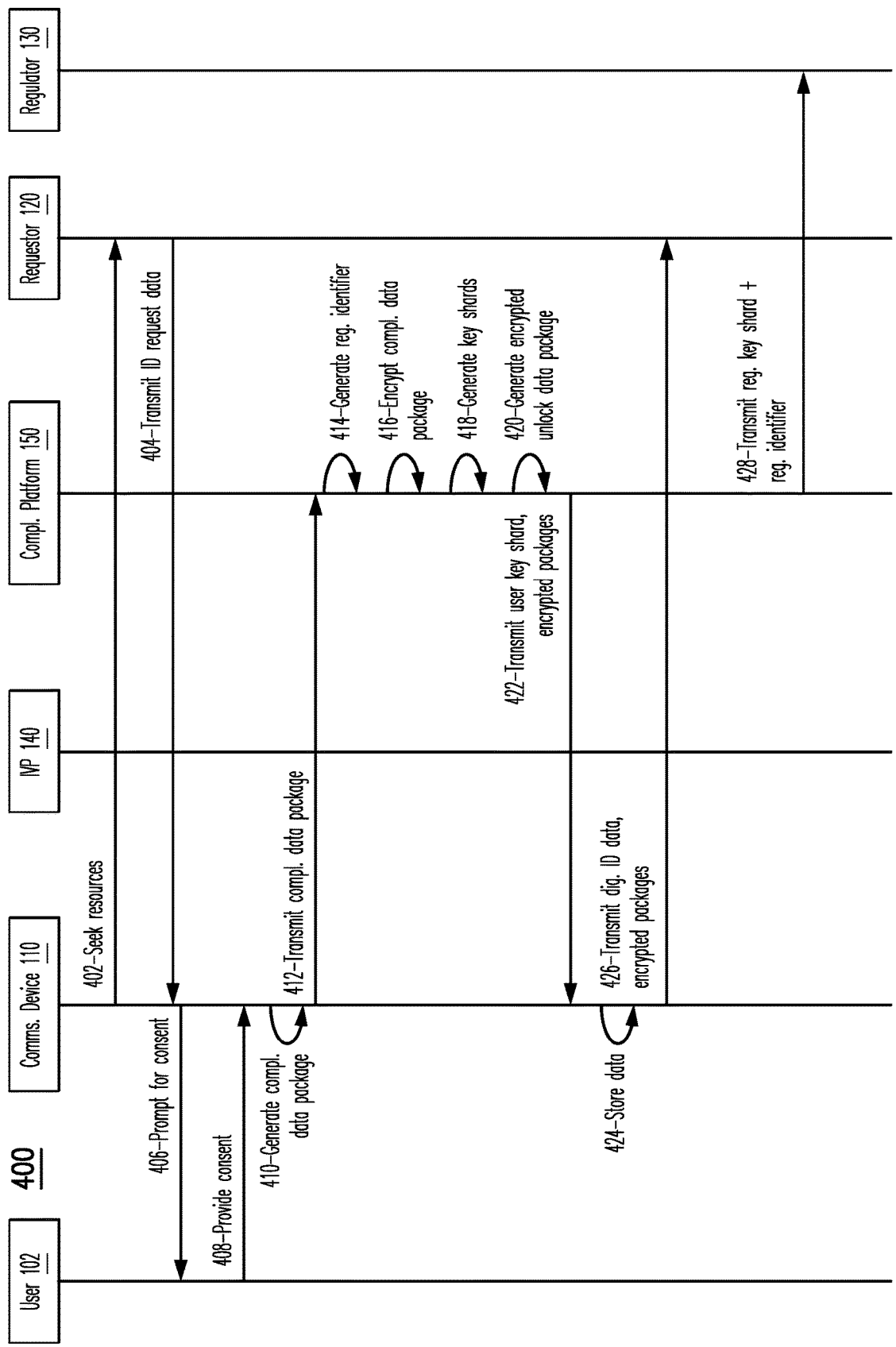

FIG. 4 illustrates a sequencing diagram 400 in accordance with implementations of various techniques described herein. In particular, the sequencing diagram 400 may represent an implementation of a process by the system 100, where the system 100 may be used to provide a compliance data package to the requestor 120. While the sequencing diagram is discussed with respect to FIGS. 1 and 2, those skilled in the art will understand that implementations may not limited to the operation and/or system discussed below.

As noted above, after successfully acquiring the issued digital identity data, at 402, the user 102 may attempt to access the one or more resources provided by and/or managed by the requestor 120. In one implementation, the user 102 may use the one or more applications of the communications device 110 to transmit access request data to the requestor 120. The access request data may include data that indicates that the user 102 seeks permission from the requestor 120 for access to the one or more resources. In particular, using the device 110, the user 102 may transmit the access request data to the one or more computing devices 121 of the requestor 120.

At 404, after receiving the access request data, the requestor 120 may use its one or more computing devices 121 to transmit identity request data to the communications device 110. The identity request data may include data that indicates a request for the user 102 to share at least a portion of its digital identity data via the decentralized identity system. The identity request data sent from the requestor 120 may also include data that indicates a request for the user 102 to provide a compliance data package, where the compliance data package may include encrypted evidence data that can be used to verify the requested digital identity data. In addition, the identity request data sent from the requestor 120 may also include regulator endpoint data. The regulator endpoint data may include data relating to the regulator 130, such as data indicating an endpoint (e.g., a Uniform Resource Locator (URL)) of the regulator 130, a name of the regulator 130, contact information for the regulator 130, and/or the like. In a further implementation, the identity request data sent from the requestor 120 may also include a requestor public key of a requestor public-private key pair.

At 406, In response to receiving the identity request data, the communications device 110 may use its one or more applications to display a prompt to the user 102 via the presentation unit of the device 110, where the prompt indicates that the requestor 120 is requesting access to the requested digital identity data and is also requesting that the user 102 provide the compliance data package. At 408, the user 102 may use an input device of the device 110 to provide a response to the one or more applications, where the response indicates that the user 102 consents to sharing the requested digital identity data with the requestor 120 and to providing the compliance data package to the requestor 120.

At 410, the communications device 110 may then use its one or more applications to generate the compliance data package. The compliance data package may be generated using evidence data, where the evidence data can be used to verify the digital identity data to be shared with the requestor 120. The user 102 may provide the device 110 with the evidence data using any technique known to those skilled in the art. In particular, the compliance data package may include encrypted evidence data and a user signature. In one implementation, the communications device 110 may use its one or more applications to generate both the encrypted evidence data and the user signature. The communications device 110 may generate the encrypted evidence data by encrypting the evidence data using the requestor public key that was previously received via the identity request data. In addition, the device 110 may generate the user signature based on the evidence data. In particular, the device 110 may generate the user signature by producing a mathematical representation of the evidence data using an algorithm (e.g., a hash algorithm) and then encrypting the mathematical representation (e.g., a hashed value) using the user private key. After generating both the encrypted evidence data and the user signature, the communications device 110 may then use its one or more applications to generate the compliance data package.

At 412, once the compliance data package has been generated, the communications device 110 may use its one or more applications to transmit the compliance data package to the compliance platform 150 (i.e., to the one or more computing devices 151). The device 110 may also use its one or more applications to transmit the regulator endpoint data (received from the requestor 120) to the compliance platform 150. In a further implementation, the device 110 may also use its one or more applications to transmit signature details data to the compliance platform 150. The signature details data may include data relating to the user signature generated by the device 110.

At 414, after receiving the data (e.g., the compliance data package, the regulator endpoint data, and the signature details data) from the communications device 110, the compliance platform 150 may use its one or more computing devices 151 to generate a regulator identifier. In one implementation, the compliance platform 150 may create the regulator identifier based on the regulator endpoint data.

In addition, after receiving the data from the device 110, the compliance platform 150 may use its one or more computing devices 151 to generate a first cryptographic key. The compliance platform 150 may create the first cryptographic key using any technique known to those skilled in the art. At 416, the compliance platform 150 may then, via the one or more computing devices 151, encrypt the compliance data package (received from the device 110) using the first cryptographic key, thereby generating the encrypted compliance data package.

At 418, upon generating the encrypted compliance data package, the compliance platform 150 may use its one or more computing devices 151 to generate a plurality of key shards based on the first cryptographic key. In one implementation, the compliance platform 150 may shard the first cryptographic key into three key shards (e.g., the user key shard, the requestor key shard, and the regulator key shard), such that any two of the key shards, at minimum, may be used to reconstruct the first cryptographic key.

After generating the key shards, the compliance platform 150 may use its one or more computing devices 151 to generate an unlock data package. The unlock data package may include the requestor key shard, the regulator identifier, and the signature details data (received from the device 110). At 420, upon generating the unlock data package, the compliance platform 150 may use its one or more computing devices 151 to encrypt the unlock data package using the platform public key.

At 422, the compliance platform 150 may then use its one or more computing devices 151 to transmit the user key shard, the encrypted unlock data package, and the encrypted compliance data package to the communications device 110. In response, at 424, the communications device 110 may use its one or more applications to store the user key shard, the encrypted unlock data package, and/or the encrypted compliance data package in the memory of the device 110. In particular, the device 110 may include the user key shard, the encrypted unlock data package, and/or the encrypted compliance data package as part of the digital identity data of the user 102.

At 426, the communications device 110 may use its one or more applications to transmit the requested digital identity data of the user 102, the encrypted unlock data package, and the encrypted compliance data package to the requestor 120. As noted above, the requested digital identity data may correspond to the digital identity data indicated by the identity request data (previously received from the requestor 120).

In addition, at 428, the compliance platform 150 may use its one or more computing devices 151 to transmit the regulator key shard and the regulator identifier to the regulator 130. In one implementation, compliance platform 150 may transmit the regulator key shard and the regulator identifier to the regulator 130 (i.e., to the one or more computing devices 131) based on the regulator endpoint data (previously received from the communications device 110). For example, the compliance platform 150 may transmit the regulator key shard and the regulator identifier to the regulator 130 using the URL indicated in the regulator endpoint data.

Figure 5:
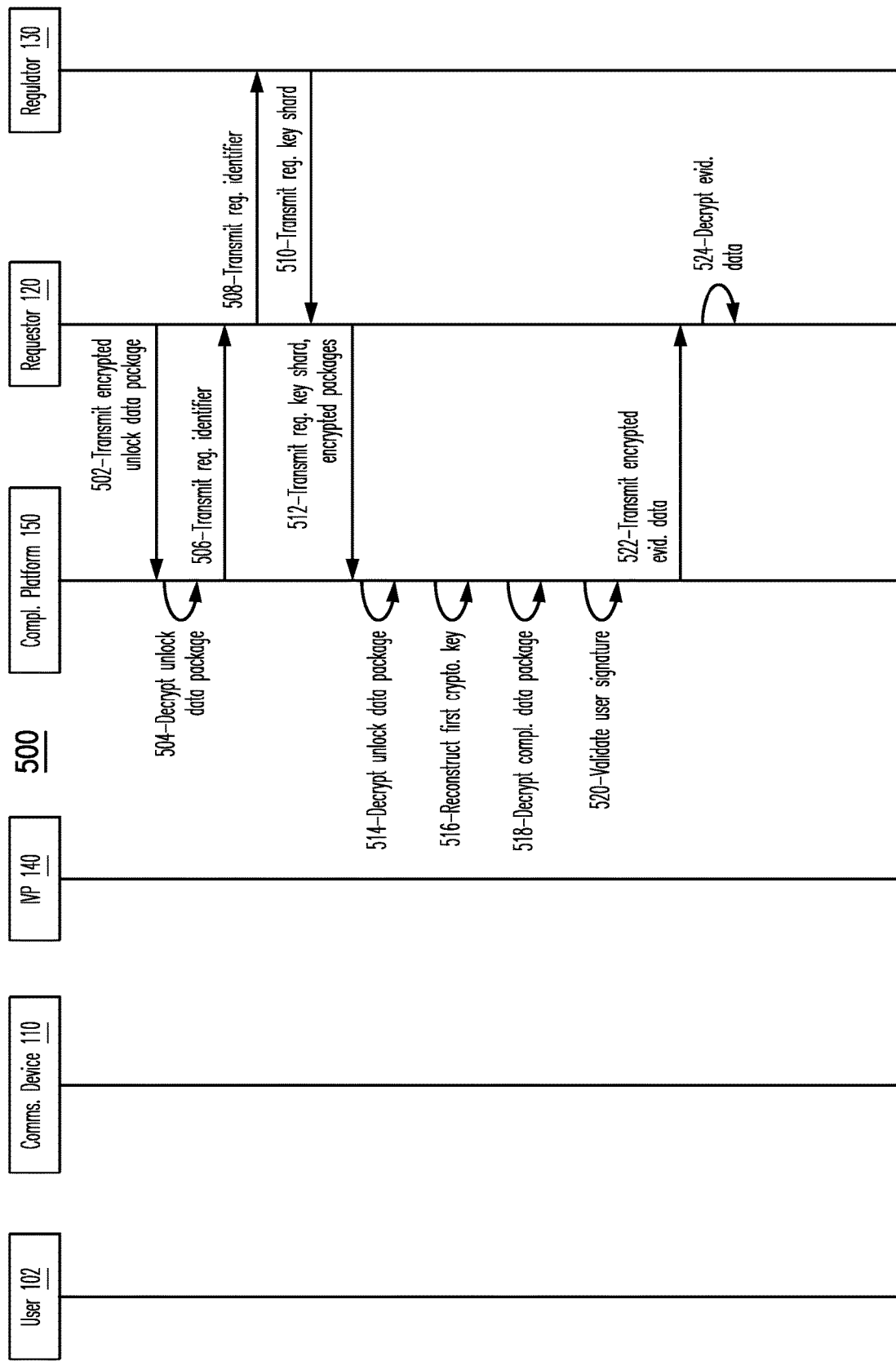

FIG. 5 illustrates a sequencing diagram 500 in accordance with implementations of various techniques described herein. In particular, the sequencing diagram 500 may represent an implementation of a process by the system 100, where the system 100 may be used such that the requestor 120 may use the regulator 130 and the compliance platform 150 to obtain the evidence data from the encrypted compliance data package. While the sequencing diagram is discussed with respect to FIGS. 1 and 2, those skilled in the art will understand that implementations may not limited to the operation and/or system discussed below.

Initially, the requestor 120 may use the compliance platform 150 to obtain the regulator identifier from the encrypted unlock data package stored in the memory of the one or more computing devices 121. At 502, the requestor 120 may use its one or more computing devices 121 to transmit the encrypted unlock data package to the compliance platform 150. In addition, the requestor 120 may use its one or more computing devices 121 to also transmit identifier request data to the compliance platform 150. The identifier request data may include data that indicates a request for the compliance platform 150 to provide the regulator identifier to the requestor 120.

Upon receiving the encrypted unlock data package and/or the identifier request data, the compliance platform 150 may use its one or more computing devices 151 to retrieve the regulator identifier from the encrypted unlock data package. In particular, at 504, the compliance platform 150 may use its platform private key to decrypt the received encrypted unlock data package. The compliance platform 150 may then retrieve the regulator identifier from the decrypted unlock data package. After retrieving the regulator identifier, at 506, the compliance platform 150 may use its one or more computing devices 151 to transmit the regulator identifier to the requestor 120.

In response to receiving the regulator identifier, the requestor 120 may use the regulator identifier to obtain the regulator key shard from the regulator 130. At 508, the requestor 120 may use its one or more computing devices 121 to transmit the regulator identifier to the regulator 130. In addition, the requestor 120 may use its one or more computing devices 121 to also transmit regulator key request data to the regulator 130. The regulator key request data may include data that indicates a request for the regulator 130 to provide the regulator key shard to the requestor 120. Upon receiving the regulator identifier and/or the regulator key request data, the regulator 130 may use its one or more computing devices 131 to retrieve the regulator key shard using the regulator identifier. At 510, after retrieving the regulator key shard, the regulator 130 may use its one or more computing devices 131 to transmit the regulator key shard to the requestor 120.

In response to receiving the regulator key shard, the requestor 120 may use the compliance platform 150 to obtain the encrypted evidence data from the encrypted compliance data package stored in the memory of the one or more computing devices 121. At 512, the requestor 120 may use its one or more computing devices 121 to transmit the regulator key shard, the encrypted unlock data package, and the encrypted compliance data package to the compliance platform 150. In addition, the requestor 120 may use its one or more computing devices 121 to also transmit evidence request data to the compliance platform 150. The evidence request data may include data that indicates a request for the compliance platform 150 to provide the encrypted evidence data to the requestor 120.

Upon receiving the regulator key shard, the encrypted unlock data package, the encrypted compliance data package, and/or the evidence request data, the compliance platform 150 may use its one or more computing devices 151 to retrieve the requestor key shard from the encrypted unlock data package. In particular, at 514, the compliance platform 150 may use the platform private key (as described above) to decrypt the received encrypted unlock data package. The compliance platform 150 may then retrieve the requestor key shard from the decrypted unlock data package. Further, the compliance platform 150 may also retrieve the signature details data from the decrypted unlock data package.

Subsequently, at 516, the compliance platform 150 may use its one or more computing devices 151 to reconstruct the first cryptographic key using the regulator key shard (received from the requestor 120) and the requestor key shard. At 518, after reconstructing the first cryptographic key, the compliance platform 150 may use its one or more computing devices 151 to decrypt the encrypted compliance data package (received from the requestor 120) using the reconstructed first cryptographic key.

The compliance platform 150 may use its one or more computing devices 151 to then retrieve the user signature and the encrypted evidence data from the decrypted compliance data package. At 520, using the signature details data retrieved from the decrypted unlock data package, the compliance platform 150 may validate the user signature using any technique known to those skilled in the art.

At 522, after successfully validating the user signature, the compliance platform 150 may use its one or more computing devices 151 to transmit the encrypted evidence data (retrieved from the decrypted compliance data package) to the requestor 120. At 524, in response to receiving the encrypted evidence data, the requestor 120 may use its one or more computing devices 121 to decrypt the encrypted evidence data using its requestor private key, thereby yielding the decrypted evidence data. As a result, using the above described interactions with the regulator 130 and the compliance platform 150, the requestor 120 may be able to obtain the evidence data from the encrypted compliance data package and then use the evidence data to verify the digital identity data provided by the user 102.

Figure 6:
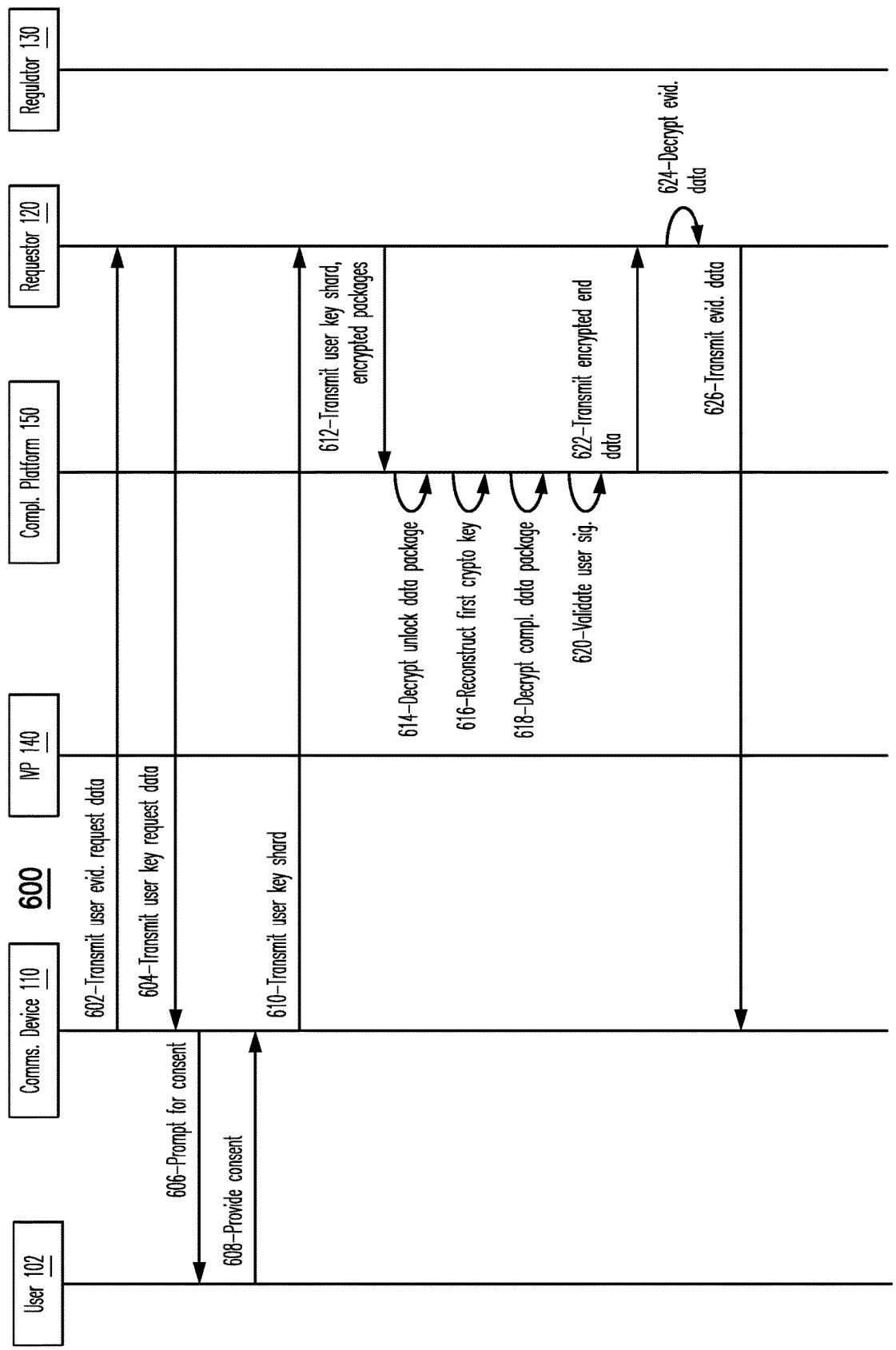

FIG. 6 illustrates a sequencing diagram 600 in accordance with implementations of various techniques described herein. In particular, the sequencing diagram 600 may represent an implementation of a process by the system 100, where the system 100 may be used such that the requestor 120 may use the user 102 and the compliance platform 150 to obtain the evidence data from the encrypted compliance data package. While the sequencing diagram is discussed with respect to FIGS. 1 and 2, those skilled in the art will understand that implementations may not limited to the operation and/or system discussed below.

Initially, at 602, the user 102 may use the one or more applications of its communications device 110 to transmit user evidence request data to the requestor 120. The user evidence request data may include data that indicates a request for the requestor 120 to obtain the evidence data from the encrypted compliance data package held by the requestor (e.g., stored in an associated memory of the one or more computing devices 121) and for the requestor 120 to transmit this evidence data to the user 102.

In response, at 604, the requestor 120 may use its one or more computing devices 121 to transmit user key request data to the communications device 110 of the user 102. The user key request data may include data that indicates a request for the user 102 to provide the user key shard to the requestor 120.

At 606, in response to receiving the user key request data, the communications device 110 may use its one or more applications to display a prompt to the user 102 via the presentation unit of the device 110, where the prompt indicates that the requestor 120 is requesting access to the user key shard. At 608, the user 102 may use an input device of the device 110 to provide a response to the one or more applications, where the response indicates that the user 102 consents to sharing the user key shard with the requestor 120. At 610, the communications device 110 may then use its one or more applications to transmit the user key shard to the requestor 120.

In response to receiving the user key shard, the requestor 120 may use the compliance platform 150 to obtain the encrypted evidence data from the encrypted compliance data package stored in the memory of the one or more computing devices 121. At 612, the requestor 120 may use its one or more computing devices 121 to transmit the user key shard, the encrypted unlock data package, and the encrypted compliance data package to the compliance platform 150. In addition, the requestor 120 may use its one or more computing devices 121 to also transmit evidence request data to the compliance platform 150. The evidence request data may include data that indicates a request for the compliance platform 150 to provide the encrypted evidence data to the requestor 120.

Upon receiving the user key shard, the encrypted unlock data package, the encrypted compliance data package, and/or the evidence request data, the compliance platform 150 may use its one or more computing devices 151 to retrieve the requestor key shard from the encrypted unlock data package. In particular, at 614, the compliance platform 150 may use the platform private key (as described above) to decrypt the received encrypted unlock data package. The compliance platform 150 may then retrieve the requestor key shard from the decrypted unlock data package. Further, the compliance platform 150 may also retrieve the signature details data from the decrypted unlock data package.

Subsequently, at 616, the compliance platform 150 may use its one or more computing devices 151 to reconstruct the first cryptographic key using the user key shard (received from the requestor 120) and the requestor key shard. At 618, after reconstructing the first cryptographic key, the compliance platform 150 may use its one or more computing devices 151 to decrypt the encrypted compliance data package (received from the requestor 120) using the reconstructed first cryptographic key.

The compliance platform 150 may use its one or more computing devices 151 to then retrieve the user signature and the encrypted evidence data from the decrypted compliance data package. At 620, using the signature details data retrieved from the decrypted unlock data package, the compliance platform 150 may validate the user signature using any technique known to those skilled in the art.

At 622, after successfully validating the user signature, the compliance platform 150 may use its one or more computing devices 151 to transmit the encrypted evidence data (retrieved from the decrypted compliance data package) to the requestor 120. At 624, in response to receiving the encrypted evidence data, the requestor 120 may use its one or more computing devices 121 to decrypt the encrypted evidence data using its requestor private key, thereby yielding the decrypted evidence data.

As a result, using the above described interactions with the user 102 and the compliance platform 150, the requestor 120 may be able to obtain the evidence data from the encrypted compliance data package. In turn, at 626, the requestor 120 may use its one or more computing devices 121 to transmit the evidence data to the communications device 110. The user 102 may then be able to obtain a copy of and/or review the evidence data held by the requestor 120.

Accordingly, in view of the implementations discussed above with respect to FIGS. 1-6, the compliance platform may be used to facilitate a sharing of a user's evidence data with a requestor in a decentralized identity system. In particular, the compliance platform may be used by the user to share a compliance data package with the requestor, where the compliance data package may include encrypted evidence data of the user that can be used to verify digital identity data shared by the user.

In some implementations, by receiving the compliance data package via the compliance platform, the requestor may be able to access the user's encrypted evidence data in order to corroborate the user's digital identity data. In one such implementation, the requestor may use the compliance data package to comply with one or more rules and/or regulations. However, in these implementations, the requestor may obtain the encrypted evidence data from the compliance data package only if the requestor is able to provide the compliance platform with a key shard (i.e., the user key shard or the regulator key shard), the encrypted unlock data package, and the encrypted compliance data package. Thus, the requestor may ultimately obtain the encrypted evidence data from the compliance platform only if the requestor is able to acquire a key shard from the user or the regulator beforehand. As a result, the compliance platform may be used to limit the requestor's access to the evidence data, which, in turn, may help the user and the requestor to utilize data minimization. For example, the distribution of the user's identity information (e.g., identity information derived from the evidence data) may be minimized, which, in turn, may lead to fewer instances of misappropriation of the user's identity information. Further, the encrypted evidence data may be decrypted only by using a cryptographic key of the requestor. In such an implementation, the distribution of the user's unencrypted evidence data may be minimized, which, in turn, may lead to fewer instances of misappropriation of the user's evidence data.

Therefore, by using the compliance platform to share the compliance data package between the user and the requestor, the user's digital identity data may be verified by the requestor in some instances (e.g., using the encrypted evidence data) while also limiting misappropriations of the user's evidence data and identity information. In turn, the user may be less likely to become a victim of identity theft, and/or other misuses of the user's identity. In addition, the compliance platform may be used to limit a number of requests for encrypted evidence data by the requestor 120, which may help to prevent the requestor 120 and/or the regulator 130 from using coercion and/or corruption to obtain the evidence data for one or more users.

The description provided herein may be directed to specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the detailed description, numerous specific details are set forth to provide a thorough understanding of the disclosure provided herein. However, the disclosure provided herein may be practiced without these specific details. In some other instances, well-known methods, procedures, components, circuits, and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving a compliance data package from a user, wherein the compliance data package comprises encrypted evidence data corresponding to digital identity data of the user;
   encrypting the compliance data package using a first cryptographic key;
   generating a plurality of key shards based on the first cryptographic key, wherein the plurality of key shards comprises a user key shard, a requestor key shard, and a regulator key shard;
   generating an encrypted unlock data package based on the requestor key shard; and
   transmitting the user key shard, the encrypted unlock data package, and the encrypted compliance data package to the user.

2. The method of claim 1, wherein:
   the digital identity data comprises data relating to identity information of the user in a decentralized identity system;

the first cryptographic key is configured to be reconstructed based on at least two of the plurality of key shards; or combinations thereof.

3. The method of claim 1, wherein:

the encrypted evidence data comprises evidence data encrypted using a requestor public key of a requestor public-private key pair; and the compliance data package further comprises a user signature generated based on the evidence data, an algorithm, a user private key of a user public-private key pair, or combinations thereof.

4. The method of claim 3, further comprising:

receiving signature details data from the user, wherein the signature details data comprises data relating to the algorithm, the user private key, or combinations thereof; and generating a regulator identifier corresponding to a regulator.

5. The method of claim 4, further comprising:

receiving regulator endpoint data from the user, wherein the regulator endpoint data comprises data relating to a Uniform Resource Locator (URL) of a regulator, a name of the regulator, contact information for the regulator, or combinations thereof; and transmitting the regulator key shard and the regulator identifier to the regulator based on the regulator endpoint data.

6. The method of claim 4, wherein generating the encrypted unlock data package comprises:

generating an unlock data package, wherein the unlock data package comprises the requestor key shard, the signature details data, and the regulator identifier; and encrypting the unlock data package using a platform public key of a platform public-private key pair.

7. The method of claim 6, further comprising:

receiving the encrypted unlock data package from a requestor;

decrypting the received encrypted unlock data package using a platform private key of the platform public-private key pair;

retrieving the regulator identifier from the decrypted unlock data package; and transmitting the retrieved regulator identifier to the requestor.

8. The method of claim 7, further comprising:

receiving the regulator key shard, the encrypted unlock data package, and the encrypted compliance data package from the requestor;

retrieving the requestor key shard and the signature details data from the decrypted unlock data package;

reconstructing the first cryptographic key based on the received regulator key shard and the retrieved requestor key shard;

decrypting the encrypted compliance data package using the reconstructed first cryptographic key;

retrieving the user signature and the encrypted evidence data from the decrypted compliance data package;

validating the retrieved user signature based on the retrieved signature details data; and transmitting the retrieved encrypted evidence data to the requestor based on the validation.

9. The method of claim 6, further comprising:

receiving the user key shard, the encrypted unlock data package, and the encrypted compliance data package from a requestor;

decrypting the received encrypted unlock data package using a platform private key of the platform public-private key pair;

retrieving the requestor key shard and the signature details data from the decrypted unlock data package;

reconstructing the first cryptographic key based on the received user key shard and the retrieved requestor key shard;

decrypting the encrypted compliance data package using the reconstructed first cryptographic key;

retrieving the user signature and the encrypted evidence data from the decrypted compliance data package;

validating the retrieved user signature based on the retrieved signature details data; and transmitting the retrieved encrypted evidence data to the requestor based on the validation.

10. A method, comprising:

transmitting identity request data to a user, wherein the identity request data comprises data indicating a request for digital identity data of the user and a compliance data package, and wherein the compliance data package comprises encrypted evidence data corresponding to the digital identity data;

receiving the digital identity data, an encrypted unlock data package, and an encrypted compliance data package from the user, wherein:

the encrypted compliance data package comprises the compliance data package encrypted using a first cryptographic key of a compliance platform; and the encrypted unlock data package comprises an unlock data package encrypted using a second cryptographic key of the compliance platform, and wherein the unlock data package comprises a requestor key shard corresponding to the first cryptographic key; and storing the digital identity data, the encrypted unlock data package, and the encrypted compliance data package.

11. The method of claim 10, wherein transmitting the identity request data comprises:

receiving access request data from the user, wherein the access request data comprises data indicating a request by the user for access to one or more resources; and transmitting the identity request data to the user in response to the access request data.

12. The method of claim 10, wherein the second cryptographic key comprises a platform public key of a platform public-private key pair.

13. The method of claim 10, further comprising:

transmitting the encrypted unlock data package to the compliance platform;

receiving a regulator identifier from the compliance platform;

transmitting the regulator identifier to a regulator;

receiving a regulator key shard from the regulator, wherein the regulator key shard corresponds to the first cryptographic key; and transmitting the regulator key shard, the encrypted unlock data package, and the encrypted compliance data package to the compliance platform.

14. The method of claim 13, further comprising:

receiving the encrypted evidence data from the compliance platform;

decrypting the encrypted evidence data using a requestor private key of a requestor public-private key pair; and verifying the digital identity data based on the decrypted evidence data.

15. The method of claim 10, wherein the encrypted evidence data comprises evidence data encrypted using a requestor public key of a requestor public-private key pair.

16. The method of claim 15, further comprising:
receiving user evidence request data from the user, wherein the user evidence request data comprises data corresponding to a request by the user for the evidence data;
transmitting user key request data to the user, wherein the user key request data comprises data corresponding to a request for a user key shard corresponding to the first cryptographic key;
receiving the user key shard from the user; and
transmitting the user key shard, the encrypted unlock data package, and the encrypted compliance data package to the compliance platform.

17. The method of claim 16, further comprising:
receiving the encrypted evidence data from the compliance platform;
decrypting the encrypted evidence data using a requestor private key of a requestor public-private key pair; and
transmitting the decrypted evidence data to the user.

18. A system, comprising:
a compliance platform, comprising:
one or more first processors; and
at least a first memory comprising a plurality of first program instructions which, when executed by the one or more first processors, cause the one or more first processors to:
receive a compliance data package from a user, wherein the compliance data package comprises encrypted evidence data corresponding to digital identity data of the user;
encrypt the compliance data package using a first cryptographic key;
generate a plurality of key shards based on the first cryptographic key, wherein the plurality of key shards comprises a user key shard, a requestor key shard, and a regulator key shard;
generate an encrypted unlock data package based on the requestor key shard; and
transmit the user key shard, the encrypted unlock data package, and the encrypted compliance data package to the user; and
a requestor, comprising:
one or more second processors; and
at least a second memory comprising a plurality of second program instructions which, when executed by the one or more second processors, cause the one or more second processors to:
transmit identity request data to the user, wherein the identity request data comprises data indicating a request for the digital identity data and the compliance data package;
receive the digital identity data, the encrypted unlock data package, and the encrypted compliance data package from the user; and
store the digital identity data, the encrypted unlock data package, and the encrypted compliance data package.

19. The system of claim 18, wherein:
the digital identity data comprises data relating to identity information of the user in a decentralized identity system;
the first cryptographic key is configured to be reconstructed based on at least two of the plurality of key shards; or
combinations thereof.

20. The system of claim 18, wherein:
the encrypted evidence data comprises evidence data encrypted using a requestor public key of a requestor public-private key pair; and
the compliance data package further comprises a user signature generated based on the evidence data, an algorithm, a user private key of a user public-private key pair, or combinations thereof.

* * * * *